(12) United States Patent
Kennedy et al.

(10) Patent No.: US 6,682,825 B1
(45) Date of Patent: Jan. 27, 2004

(54) FILMS HAVING ENHANCED SEALING CHARACTERISTICS AND PACKAGES CONTAINING SAME

(75) Inventors: Thomas Duane Kennedy, Simpsonville, SC (US); Gordon Vincent Sharps, Jr., Greer, SC (US); Richard Keith Watson, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 1,160 days.

(21) Appl. No.: 08/254,345

(22) Filed: Jun. 6, 1994

(51) Int. Cl.$^7$ ............................................... B32B 27/32
(52) U.S. Cl. ...................... 428/517; 428/213; 428/515; 428/516; 428/523
(58) Field of Search ................................ 428/515, 516, 428/517, 523, 213

(56) References Cited

U.S. PATENT DOCUMENTS

| | | | |
|---|---|---|---|
| 3,553,768 A | | 1/1971 | Wilmsen ........................ 17/35 |
| 3,798,302 A | | 3/1974 | Kostner et al. .............. 264/310 |
| 4,044,426 A | | 8/1977 | Kupcikevicius et al. ........ 17/49 |
| 4,064,296 A | | 12/1977 | Bonrstein et al. ............. 428/35 |
| 4,120,716 A | | 10/1978 | Bonet .......................... 156/272 |
| 4,302,565 A | | 11/1981 | Goeke et al. ................. 526/88 |
| 4,302,566 A | | 11/1981 | Karol et al. ................. 526/125 |
| 4,407,873 A | | 10/1983 | Christensen et al. .......... 428/35 |
| 4,481,254 A | * | 11/1984 | Fukushima et al. ......... 428/520 |
| 4,558,488 A | | 12/1985 | Martinek ......................... 17/41 |
| 4,859,514 A | * | 8/1989 | Friedrich et al. ............ 428/516 |
| 4,879,430 A | | 11/1989 | Hoffman ....................... 428/35 |
| 5,061,572 A | * | 10/1991 | Hamada et al. ............. 428/516 |
| 5,169,728 A | * | 12/1992 | Murphy et al. ............. 428/516 |
| 5,206,075 A | | 4/1993 | Hodgson, Jr. ................ 428/216 |
| 5,241,031 A | | 8/1993 | Mehta ......................... 526/348 |
| 5,272,236 A | | 12/1993 | Lai et al. .................... 526/348 |
| 5,278,272 A | | 1/1994 | Lai et al. .................... 526/348 |
| 5,298,326 A | * | 3/1994 | Norpoth et al. ............. 428/516 |
| 5,462,807 A | * | 10/1995 | Halle et al. ................. 428/500 |

FOREIGN PATENT DOCUMENTS

| | | |
|---|---|---|
| AU | 635053 | 3/1993 |
| EP | 0024270 | 2/1981 |
| EP | 0111602 | 6/1984 |
| EP | 0276908 | 8/1988 |
| EP | 0308131 | 3/1989 |
| EP | 0358465 | 3/1990 |
| EP | 0580377 | 1/1994 |
| GB | 2074046 | 10/1981 |
| GB | 2206890 | 1/1989 |
| JP | 79-90293b | 11/1979 |
| JP | 86-16038181 | 10/1984 |
| JP | 61 094753 A | 5/1986 |
| JP | 62 11761 A | 1/1987 |
| JP | 87-054628 | 1/1987 |
| JP | 4003903 B | 1/1992 |
| WO | WO 90/03414 | 4/1990 |
| WO | WO 93/03093 | 2/1993 |
| WO | 95/05942 | 3/1995 |

OTHER PUBLICATIONS

Handbook of Plastic Materials and Technology, Irvin I. Rubin, Robinson Plastics Corporation, New York, pp. 311–316.
US, ASTM D–2732, 356–359.
US, PAX–Plus Grade: 3201, Paxon Polymer Co., Data Sheet.
US, MSDS No. 5, Paxon Polymer Co., 1–6.
US, Deter. of Branching . . . , J. Polym. Science, 441–455.
US, Total Quality HDPE, Paxon Polymer Co., Brochure.
US, High Density Polyehtylene, Paxon Polymer Co., Brochure.
US, Tafmer A/P, Mitsui Sekka, Brochure.
US, Pax–Plus Guide: 3303, Paxon Polymer Co., Data Sheet.
US, Pax–Plus Grade 3205, Paxon Polymer Co., Data Sheet.
US, Pax–Plus Grade 3204, Paxon Polymer Co., Data Sheet.

* cited by examiner

*Primary Examiner*—Fred Teskin
(74) *Attorney, Agent, or Firm*—Rupert B. Hurley Jr.

(57) ABSTRACT

Films containing a sealant layer composition comprising:
 (1) polyethylene homopolymer, and ethylene/alpha-olefin copolymer, ethylene vinyl acetate copolymer, and ethylene/acrylate copolymer; and
 (2) elastomer, plastomer, ionomer, and carboxyl-modified polyethylene;
when sealed to another outer film layer comprising at least one member selected from the group consisting of ionomer, ethylene/acid copolymer, ethylene/vinyl acetate copolymer and ethylene/acrylate copolymer, have been discovered to provide a seal strength comparable to an ionomer to ionomer seal.

24 Claims, 19 Drawing Sheets

FILMS HAVING ENHANCED SEALING CHARACTERISTICS AND PACKAGES CONTAINING SAME

FIELD OF THE INVENTION

The present invention relates generally to films, both monolayer films and multilayer films, and particularly to packaging films. The present invention also relates to packages, especially packages having one or more seals, as well as packaged products. The present invention is particularly related to films suitable for sealing, especially heat sealing.

BACKGROUND OF THE INVENTION

Multilayer films having one or more tie layers containing a blend of an ethylene/alpha-olefin copolymer and a plastomer and/or an elastomer, are known. Such tie layers are internal film layers which those of skill in the art recognize as being compatible with other compositions, i.e., suitable for direct adhesion to, for example, ionomers and polyethylene homopolymers and copolymers.

Multilayer films with one or more surface layers containing a blend of an ethylene/alpha-olefin copolymer and a plastomer, and/or an elastomer, are also known. However, such films have been used in a manner in which the outer blend-containing sealing layer is sealed to itself, and the package is a high strength, heat-resistant structure which has been used as dunnage bags (which contain air, and are used to stabilize loads during shipping, these films comprising an ethylene/alpha-olefin copolymer having a density of about 0.916 or greater) and for use in the packaging of water softener, i.e., salt pellets.

Ionomers such as metal-neutralized copolymers of an olefin and a carboxylic acid are also known for use in an outer film layer. Ionomers are advantageous in the (outer) sealing layer of a film because they melt at relatively low temperature and produce a relatively strong heat seal. However, ionomers are expensive relative to other polymers typically used in packaging films.

Since ionomer-containing resins are expensive, it would be desirable to use less ionomer, or no ionomer, without sacrificing the advantageous properties provided by ionomers, such as low seal initiation temperature, relatively high seal strength, relatively high hot tack strength, suitability for seals used in cook-in conditions, acceptable for food contact, etc. Furthermore, it would also be desirable to provide a film having a relatively thick layer or layers which undergo melt flow during sealing, so that the resulting seal is capable of sealing through or around surface imperfections, or contamination such as dust, fat, water, the product being packaged, e.g. food, such as meat. Of course, it would also be desirable to provide at low cost this relatively thick region capable of melt flow during sealing, i.e., using compositions which are inexpensive, especially compositions less expensive than ionomer.

SUMMARY OF THE INVENTION

The present invention is the result of a discovery that a polymer composition which includes two or more different polymers, in an outer sealant layer and/or a seal-assist layer in packaging films, provide the films with highly desirable sealing characteristics, including one or more of the following: (a) low seal initiation temperature, (b) high seal strength, (c) high hot tack strength, (d) suitability for seals used under cook-in conditions, and (e) acceptable outer layer for use in direct contact with food. Moreover, it is most significant that these compositions rival the sealing performance of ionomer compositions which currently set the standard of commercial performance with respect to sealing, while being substantially less expensive than ionomer compositions. Thus, the present invention permits the use of less ionomer, or no ionomer, without sacrificing the advantageous seal properties provided by ionomers.

Furthermore, the composition of the present invention can be used to provide a film having a relatively thick layer or layers which undergo melt flow during sealing, so that the film is capable of sealing through contamination such as dust, fat, water, the product being packaged, especially food, such as meat, as well as sealing around surface imperfections. Providing such a relatively thick surface of ionomer is often so expensive that it is not commercially cost-prohibitive. Thus, the present invention enables the use of relatively thick sealing layers, with their respective advantages as set forth above, in commercial applications which previously have been cost-prohibitive.

As a first aspect, the present invention pertains to a package comprising a seal of a first outer film layer to a second outer film layer. The first outer film layer comprises a composition. The composition comprises a first component and a second component. The first component comprises at least one member selected from the group consisting of polyethylene homopolymer, and ethylene/alpha-olefin copolymer. The second component comprises at least one member selected from the group consisting of elastomer, plastomer, and carboxyl-modified polyethylene. The second outer film layer comprises at least one member selected from the group consisting of ionomer, ethylene/acid copolymer, and carboxyl-modified polyethylene.

Preferably, the first outer film layer comprises from about 1 to 99 percent of the total thickness of the film in which it is present; more preferably, from about 3 to 75 percent; still more preferably, from about 5 to 40 percent; and yet still more preferably, from about 7 to 25 percent.

Preferably, the first outer film layer has a seal initiation temperature of from about 175° F. to 300° F.; more preferably, from about 175° F. to 250° F.; and, still more preferably, from about 175° F. to 225° F.

Preferably, the composition comprising the first component and the second component comprises from about 5 to 95 weight percent of the first component with from about 95 to 5 weight percent of the second component; more preferably, from about 50 to 90 weight percent of the first component with from about 10 to 50 weight percent of the second component; still more preferably, from about 80 to 30 weight percent of the first component with from about 20 to 70 weight percent of the second component; and yet still more preferably, from about 70 to 50 weight percent of the first component with from about 30 to 50 weight percent of. the second component.

As a second aspect, the present invention pertains to a package comprising a seal of a first outer film layer to a second outer film layer. The first outer film layer comprises a composition. The composition comprises a first component and a second component. The first component comprises at least one member selected from the group consisting of ethylene/vinyl acetate copolymer, and ethylene/acrylate copolymer. The second component comprises at least one member selected from the group consisting of elastomer, plastomer, and carboxyl-modified polyethylene. The second outer film layer comprises at least one member selected from the group consisting of ionomer, ethylene/acid copolymer, ethylene/vinyl acetate copolymer, and ethylene/acrylate copolymer.

Preferably, the ethylene/vinyl acetate copolymer has a vinyl acetate (polymerization unit) content of from about 1 to 26 weight percent; more preferably, from about 4.5 to 19 weight percent; an still more preferably, from about 6 to 19 weight percent.

Preferably, the ethylene/vinyl acetate copolymer has a density of from about 0.91 to 0.95 g/cc; more preferably, from about 0.92 to 0.95; still more preferably, from about 0.93 to 0.95. Preferably, the ethylene/acrylate copolymer has a density of from about 0.91 to 0.95 g/cc; more preferably, from about 0.92 to 0.95; still more preferably, from about 0.93 to 0.95.

As a third aspect, the present invention pertains to a package comprising a seal of a region of a first outer film layer to a region of a second outer film layer. Each of the outer film layers comprises a composition. The composition comprises a first component and a second component. The first component comprises at least one member selected from the group consisting of polyethylene homopolymer, ethylene/alpha-olefin copolymer, ethylene/vinyl acetate copolymer, and ethylene/acrylate copolymer. The second component comprises at least one member selected from the group consisting of elastomer, plastomer, ionomer, and carboxyl-modified polyethylene.

As a fourth aspect, the present invention pertains to a multilayer film. The multilayer film comprises an outer sealant layer and a core seal-assist layer. The outer sealant layer comprises at least one member selected from the group consisting of ionomer, carboxyl-modified polyethylene, and ethylene/acid copolymer. The outer sealant layer has a thickness of from about 1 percent to 20 percent, based on a total thickness of the multilayer film; preferably 5 to 15 percent; more preferably 7 to 10 percent; still more preferably 6 to 8 percent. Preferably, the seal-assist layer has a thickness of from about 10 to 95 percent, based on the total thickness of the film; more preferably, from about 10 to 50 percent; still more preferably, from about 10 to 30 percent. Preferably, the total thickness of the outer seal layer together with the seal-assist layer is from about 0.15 to 3 mils; more preferably, from about 0.5 to 2 mils; still more preferably, from about 0.5 to 1 mil.

The core seal-assist layer comprises a composition. The composition comprises a first component and a second component. The first component comprises at least one member selected from the group consisting of polyethylene homopolymer, ethylene/alpha-olefin copolymer, ethylene/vinyl acetate copolymer, and ethylene/acrylate copolymer. The second component comprises at least one member selected from the group consisting of elastomer, plastomer, ionomer, and carboxyl-modified polyethylene.

As a fifth aspect, the present invention pertains to a package comprising a seal of a first region of a first outer film layer to a second region of a second outer film layer. The first outer film layer comprises a homogeneous ethylene/alpha-olefin copolymer, and the second outer film layer comprises at least one member selected from the group consisting of ionomer, ethylene/acid copolymer, carboxyl-modified polyethylene. The seal has a strength of at least 2 lb/in; preferably a strength of from about 2 to 10 lb/in.; more preferably from about 3 to 10 lb/in.; still more preferably, from about 5 to 10 lb/in.

As a sixth aspect, the present invention pertains to a film comprising a composition. The composition comprises a first component and a second component. The first component comprises at least one member selected from the group consisting of polyethylene homopolymer, ethylene/alpha-olefin copolymer, ethylene/vinyl acetate copolymer, and ethylene/acrylate copolymer. The second component comprises at least one member selected from the group consisting of elastomer, plastomer, and carboxyl-modified polyethylene.

As a seventh aspect, the present invention pertains to a film comprising a first layer, a second layer, and a third layer. The first layer is an outer sealant layer, and the first layer comprises a first composition. The first composition comprises a first component and a second component. The first component comprises at least one member selected from the group consisting of polyethylene homopolymer, ethylene/alpha-olefin copolymer, ethylene/vinyl acetate copolymer, and ethylene/acrylate copolymer. The second component comprises at least one member selected from the group consisting of elastomer, plastomer, and carboxyl-modified polyethylene. The second layer comprising a second composition. The second composition comprises a third component and a fourth. component. The third component comprises at least one member selected from the group consisting of polyethylene homopolymer, ethylene/alpha-olefin copolymer, ethylene/vinyl acetate copolymer, and ethylene/acrylate copolymer. The fourth component comprises at least one member selected from the group consisting of elastomer, plastomer, ionomer, and carboxyl-modified polyethylene. The first composition is different from the second composition.

As an eighth aspect, the present invention pertains to a multilayer film comprising a first layer and a second layer. The first layer is a seal-assist layer, and the first layer comprises a first composition. The first composition comprises a first component and a second component. The first component comprises at least one member selected from the group consisting of polyethylene homopolymer, ethylene/alpha-olefin copolymer, ethylene/vinyl acetate copolymer, and ethylene/acrylate copolymer. The second component comprises at least one member selected from the group consisting of elastomer, plastomer, and carboxyl-modified polyethylene. The second layer is an outer sealant layer, and the outer sealant layer comprising at least one member selected from the group consisting of ionomer, ethylene/acid copolymer, and carboxyl modified polyethylene.

As a ninth aspect, the present invention pertains to a multilayer film comprising a first layer, a second layer, a third layer, a fourth layer, a fifth layer, and a sixth layer. The first layer is an outer sealant layer as well as a food-contact layer, and the first layer comprises at least one member selected from the group consisting of ionomer, ethylene/acid copolymer, and carboxyl-modified polyethylene. The second layer is an outer layer as well as being a non-food-contact layer. The third layer is a seal-assist layer, and the third layer is between the first layer and the second layer. The third layer comprises a first composition. The first composition comprises a first component and a second component. The first component comprises at least one member selected from the group consisting of polyethylene homopolymer, ethylene/alpha-olefin copolymer, ethylene/vinyl acetate copolymer, and ethylene/acrylate copolymer. The second component comprises at least one member selected from the group consisting of elastomer, plastomer, ionomer, and carboxyl-modif ied polyethylene. The fourth layer is a memory layer, and the fourth layer is between the second layer and the third layer. The fifth layer is a tie layer, and the fifth layer is between the third layer and the fourth layer. The sixth layer is a tie layer, and the sixth layer is between the second layer and the fourth layer.

DETAILED DESCRIPTION OF THE INVENTION

Figure 1:
FIG. 1 illustrates an enlarged cross-sectional view of a monolayer film in accord with the present invention.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the term "plastomer" refers to any of a family of thermoplastic-elastomeric, styrene/butadiene copolymers whose molecules have a radial or star structure in which several polybutadiene chains extend from a central hub, with a polystyrene block at the outward end of each segment. Preferably, the plastomer comprises homogeneous ethylene/alpha olefin copolymer; more preferably, homogeneous ethylene/alpha-olefin copolymer having a density of from about 0.86 to 0.91; still more preferably, homogeneous ethylene/alpha-olefin copolymer having a density of from about 0.86 to 0.879. As used herein, the term plastomer is inclusive of such copolymers regardless of whether the copolymer is cured or uncured.

As used herein, the term "elastomer" refers to a material that at room temperature can be stretched repeatedly to at least twice its original length and, immediately upon release of the stress, returns with force to its approximate original length. This characteristic distinguishes plastics from elastomers and rubbers, as well as the fact that elastomers are given their final properties by mastication with fillers, processing aids, antioxidants, curing agents, etc., followed by vulcanization (curing) at elevated temperatures. Only a few elastomers are thermoplastic in nature. As used herein, the term "elastomer" is inclusive of: thermoplastic elastomers ("TPE'S") such as ethylene propylene diene monomer ("EPDM"), butyl rubber, styrene-butadiene block copolymer, chlorinated butyl rubber, and ethylene propylene rubber, thermoplastic urethane ("TPU"), thermoplastic olefin ("TPO"); and ethylene propylene rubber ("EPR"). As used herein, the term elastomer is inclusive of such materials regardless of whether the material is cured or uncured.

Preferably, the elastomer used in the present invention comprises at least one member selected from the group consisting of: acrylonitrile/chloroprene copolymer, acrylonitrile/isoprene copolymer, butadiene/acrylonitrile copolymer, chlorinated polyethylene, chlorosulfonated polyethylene, ethylene ether polysulfide, ethylene/ethyl acrylate copolymer, ethylene polysulfide, ethylene/propylene copolymer, ethylene/propylene/diene terpolymer, fluoroelastomer, fluorosilicone, hexafluoropropylene/ vinylidene fluoride copolymer, isobutene/isoprene copolymer, organopolysiloxane, acrylic ester/butadiene copolymer, polybutadiene, polychloroprene, polyepichlorohydrin, polyisobutene, polyisoprene, polyurethane (polyester), polyurethane (polyether), polyurethane (polyether and polyester), styrene/butadiene copolymer, styrene/chloroprene copolymer, polyethylene/butyl graft copolymer, and styrene/butadiene/styrene triblock polymer.

The term "ionomer", as used herein, refers to a product of an ionic polymerization, i.e., a polymer containing interchain ionic bonding. Preferably, the ionomer comprises at least one member selected from the group consisting of a thermoplastic resin based on metal salt of an alkene/acid copolymer; more preferably, a thermoplastic resin based on metal salt of ethylene/acid copolymer; still more preferably, ethylene/methacrylic acid copolymer. As used herein, the term "ionomer" also includes ethylene/acrylic acid copolymer and ethylene/acid/acrylate terpolymer.

As used herein, the phrase "carboxyl-modified polyethylene" refers to a class of polymers which are similar to ionomers, but which are herein considered to be chemically distinct from ionomers. Carboxyl-modified polyethylene, also referred to as "EMA ionomer", is produced from metal-based materials such as zinc acetate or sodium hydroxide reacted with ethylene/methacrylate copolymer, as is known to those of skill in the polymer art. Ethylene/butyl acrylate copolymer is another carboxyl-modified polyethylene.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers adjacent this sealant layer often being sealed to itself, and frequently serving as a food contact layer in the packaging of foods. In general, a sealant layer sealed by heatsealing layer comprises any thermoplastic polymer; preferably, the heat-sealing layer comprises, for example, thermoplastic polyolefin, thermoplastic polyamide, thermoplastic polyester, and thermoplastic polyvinyl chloride; more preferably, thermoplastic polyolefin; still more preferably, thermoplastic polyolefin having less than 60 weight percent crystallinity.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc.

As used herein, the phrase "non-contact sealant layer" refers to an outer film layer which is suitable for use as a sealant layer, but which, when the film is used to make a package, is the film layer on the outside of the package, and therefore has no substantial direct contact with the product within the package. The non-contact sealant layer can comprise a composition comprising a homogeneous ethylene/alpha-olefin copolymer and a homogeneous ethylene/alpha-olefin copolymer plastomer; preferably, the non-contact sealant layer comprises an ethylene/alpha-olefin copolymer; more preferably, the non-contact sealant layer comprises a homogeneous ethylene/alpha-olefin copolymer.

As used herein, the phrase "seal-assist layer" refers to a core layer of a multilayer film which is within about 3 mils of an outer surface of the film, this core layer having a seal initiation temperature no higher than the temperature this layer reaches during a heat sealing operation. Preferably, the core seal-assist layer comprises a polymer having a seal initiation temperature of from about 175° F. to 300° F.

As used herein, with respect to the seal layer and/or the seal-assist layer, if the "composition" present in one or more of these layers comprises a "first component" and a "second component", or if the composition comprises a "third component" and a "fourth component", the two components in the layer are polymeric components which are substantially uniformly intermixed, i.e., uniformly blended, with one another, so that the composition is substantially homogeneous with respect to the presence of both the first component and the second component.

Furthermore, the components in the composition used in the present invention are different components. For example, if the first component is an ethylene/alpha-olefin copolymer, and the second component is a homogeneous ethylene/alpha-olefin copolymer plastomer, although the first component can also be a homogeneous ethylene/alpha-olefin copolymer plastomer, the first component must be chemically different from the second component. As a first preferred difference, the first component has a density of from about 0.88 to 0.93 g/cc (more preferably, 0.89 to 0.92; still more preferably, 0.90 to 0.92, and yet still more preferably, 0.90 to 0.915), whereas the second component has a density of from about 0.86 to 0.91 g/cc (more preferably, 0.86 to 0.879).

As an alternative difference between the first component and the second component in the composition, there is a difference in the Vicat Softening Point between the two components. Vicat Softening Point is the temperature at which a flat-nosed needle of 1 $mm^2$ circular cross section penetrates a thermoplastic specimen to a depth of 1 mm under a specified load using a uniform rate of temperature rise (ASTM D 1525, hereby incorporated by reference thereto, in its entirety). Preferably the first component has a Vicat Softening Point of from 1° C. to 100° C. higher than the Vicat Softening Point of the second component; more preferably 10° C. to 75° C. higher; still more preferably, 20° C. to 50° C. higher. However, the greater the difference in Vicat Softening Point, the greater the potential for enhancing the advantages provided by the present invention.

The outer sealant layer, in film according to the present invention, can further comprise an anhydride functionality. The presence of the anhydride functionality is especially advantageous if the film is to be used in a cook-in application, and the outer sealant layer is to be in direct contact with a product comprising meat. The anhydride functionality increases the degree of meat adhesion obtained, thereby preventing purge during cook-in. This subject matter is discussed in detail in copending U.S. patent application Ser. No. 08/229,049, filed Apr. 18, 1994, entitled "Film Having Anhydride Functionality in Outer Layer, Process for Making Same, Packaging Using Same, and Packaged Product Comprising Same", which is hereby incorporated by reference thereto, in its entirety.

As used herein, the term "barrier", and the phrase "barrier layer", as applied to films and/or film layers, is used with reference to the ability of a film or film layer to serve as a barrier to one or more gases. Oxygen (i.e., $O_2$) barrier layers can comprise, for example, ethylene/vinyl alcohol copolymer, polyvinyl chloride, polyvinylidene chloride, polyamide, polyester, polyacrylonitrile, etc., as known to those of skill in the art; preferably, the oxygen barrier layer comprises ethylene/vinyl alcohol copolymer, polyvinyl chloride, polyvinylidene chloride, and polyamide; more preferably, ethylene/vinyl alcohol copolymer.

As used herein, the phrase "abuse layer" refers to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer having a modulus of at least $10^7$ Pascals, at room temperature; more preferably, the abuse layer comprises at least one member selected from the group consisting of polyamide, ethylene/propylene copolymer; more preferably, nylon 6, nylon 6/6, amorphous nylon, and ethylene/propylene copolymer.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "skin layer" refers to an outside layer of a multilayer film in packaging a product, this skin layer being subject to abuse. Accordingly, the preferred polymers for the skin layer are the same as the preferred polymers for the abuse layer.

As used herein, the phrase "tie layer" refers to any internal layer having the primary purpose of adhering two layers to one another. Tie layers can comprise any nonpolymer polymer having a polar group grafted thereon, so that the polymer is capable of covalent bonding to polar polymers such as polyamide and ethylene/vinyl alcohol copolymer; preferably, tie layers comprise at least one member selected from the group consisting of modified polyolefin, modified ethylene/vinyl acetate copolymer, and homogeneous ethylene/alpha-olefin copolymer; more preferably, tie layers comprise at least one member selected from the group consisting of anhydride modified grafted linear low density polyethylene, anhydride grafted low density polyethylene, homogeneous ethylene/alpha-olefin copolymer, and anhydride grafted ethylene/vinyl acetate copolymer.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc. Preferably, bulk layers comprise polyolefin; more preferably, at least one member selected from the group consisting of ethylene/alpha-olefin copolymer, ethylene/alpha-olefin copolymer plastomer, low density polyethylene, and linear low density polyethylene.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the phrase "thermoforming layer" refers to a film layer which can be heated and drawn into a cavity while maintaining uniform thinning, as opposed films or film layers which lose integrity during the thermoforming process (e.g. polyethylene homopolymers do not undergo thermoforming with uniform thinning). Preferably, thermoforming layers comprise polyamide, ethylene/propylene copolymer, and propylene homopolymer; more preferably, nylon 6, nylon 6/6, amorphous nylon, ethylene/propylene copolymer, and propylene homopolymer.

As used herein, the phrase "heat-resistant layer" refers to a film layer which has a relatively high melt temperature and/or relatively high heat distortion temperature, relative to the remainder of the film, especially relative to the sealant layer(s). Preferably, heat-resistant layers comprise at least one member selected from the group consisting of polyamide and propylene homopolymer; more preferably, nylon 6, nylon 6/6, amorphous nylon, and propylene homopolymer.

As used herein, the phrase "ultraviolet-protection layer" refers to a film layer which have the capability of absorbing ultraviolet radiation, so that the ultraviolet radiation cannot penetrate the film and be absorbed by the product. Preferably, ultraviolet-protection layers comprise a polyamide; more preferably, at least one member selected from the group consisting nylon 6 and amorphous nylon.

As used herein, the phrase "memory layer" refers to a film layer which has elastic characteristics below its plastic deformation point, i.e., elongation at yield. Memory layers can comprise any polymer which has relatively high elongation at yield; preferably, memory layers comprise a polyamide; more preferably, nylon 6.

As used herein, the phrase "meat-contact layer", refers to a layer of a multilayer film which is in direct contact with the meat-containing product packaged in the film. The meat-contact layer is an outer layer, in order to be in direct contact with the meat product. The meat-contact layer is an inside layer in the sense that in the packaged meat product, the meat-contact layer is the innermost film layer in direct contact with the food.

As used herein, the phrase "meat-contact surface" refers to a surface of a meat-contact layer which is in direct contact with the meat in the package.

As used herein, the phrase "cook-in" refers to the process of cooking a product packaged in a material capable of withstanding exposure to long and slow cooking conditions while containing the food product, for example submersion in water at 57° C. to 121° C. (i.e, 135° F.–250° F.) for 2–12 hours, preferably 57° C. to 100° C. (i.e, 135° F.–250° F.) for 2–12 hours. Cook-in packaged foods are essentially pre-packaged, pre-cooked foods which may be directly transferred to the consumer in this form. These types of foods may be consumed with or without warming. Cook-in packaging materials maintain seal integrity, and in the case of multilayer films are delamination resistant. Cook-in films must also be heat shrinkable under cook-in conditions so as to form a tightly fitting package. Cook-in films preferably have a tendency for adhesion to the food product, thereby preventing "cook-out", which is the collection of juices between the outer surface of the food product and the meat-contact surface of the film, i.e., the surface in direct contact with the meat. Additional optional characteristics of films for use in cook-in applications include delamination-resistance, low O2 permeability, heat-shrinkability representing about 20–50% biaxial shrinkage at about 85° C. (185° F.), and optical clarity.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

Slurry polymerization processes generally use superatmospheric pressures and temperatures in the range of 40°–100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, gas-phase polymerization process utilizes superatmospheric pressure and temperature in the range of about 50°–120° C. Gas phase polymerization can be performed in a stirred or fluidized bed of catalyst and product particles in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

High pressure polymerization processes utilize a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerizes in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "polymerization units" derived from the monomers from which the copolymer is produced.

As used herein, the phrase "polymerization unit" refers to a unit of a polymer, as derived from a monomer used in the polymerization reaction. For example, the phrase "alpha-olefin polymerization units" refers to a unit in, for example, an ethylene/alpha-olefin copolymer, the polymerization unit being that residue which is derived from the alpha-olefin monomer after it reacts to become a portion of the polymer chain.

Either of the named monomers may copolymerize in a higher weight or molar percent. However, the first listed monomer preferably polymerizes in a higher weight percent than the second listed monomer, and, for copolymers which are terpolymers, quadripolymers, etc., preferably the monomer specified first in the name, i.e, the first-specified monomer, copolymerized in a higher weight percent than the second-specified monomer, and in turn the second-specified monomer copolymerizes in a higher weight percent than the third-specified monomer, etc.

As used herein, terminology employing a "/" with respect to the chemical identity of a copolymer (e.g., "an ethylene/alpha-olefin copolymer"), identifies the comonomers which are copolymerized to produce the copolymer. Such phrases as "ethylene alpha-olefin copolymer" is the respective equivalent of "ethylene/alpha-olefin copolymer."

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefins. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of one genus of homogeneous ethylene/alpha-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polypropylene homopolymers, polyethylene homopolymers, poly-butene, propylene/alpha-olefin copolymers, ethylene/alpha-olefin copolymers, butene/alpha-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT(™) materials supplied by Exxon, and TAFMER (™) materials supplied by Mitsui Petrochemical Corporation. These materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY(™) resins, are also included as another type of ethylene alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

Although the majority of the above definitions are substantially as understood by those of skill in the art, one or more of the above definitions may be defined hereinabove in a manner differing from the meaning as ordinarily understood by those of skill in the art, due to the particular description herein of the present invention.

DISCUSSION OF THE FIGURES

In general, the film used in the present invention can be a monolayer film or a multilayer film. The multilayer film illustrated in FIG. 1 is a monolayer film; in FIG. 2, two layers; in FIG. 3, three layers; in FIG. 4, four layers; in FIG. 5, nine layers; and in FIG. 6, eight layers; in FIG. 7, seven layers; in FIG. 8, eight layers; in FIG. 9, six layers. Preferably, the film used in the present invention comprises from 2 to 20 layers; more preferably, from 2 to 12 layers; and still more preferably, from 4 to 9 layers.

In general, the multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.5 to 15 mils (1 mil equals 0.001 inch); more preferably, from about 1 to 10 mils; and still more preferably, from 2 to 8 mils.

In FIG. 1, monolayer film 30 is composed of a substantially homogeneous composition comprising a homogeneous ethylene/alpha-olefin copolymer, a homogeneous ethylene/alpha-olefin copolymer plastomer, and low density polyethylene. Table I provides the structural and compositional characteristics of this film.

TABLE I

| film type | layer function | chemical identity | percent of total film thickness |
|---|---|---|---|
| monolayer | sealant, bulk, etc. | 60% 0.900 g/cc homogeneous Et/alpha-olefin; 35% 0.87 g/cc homogeneous plastomer; 5% 0.923 g/cc LDPE | 100 |

Figure 2:
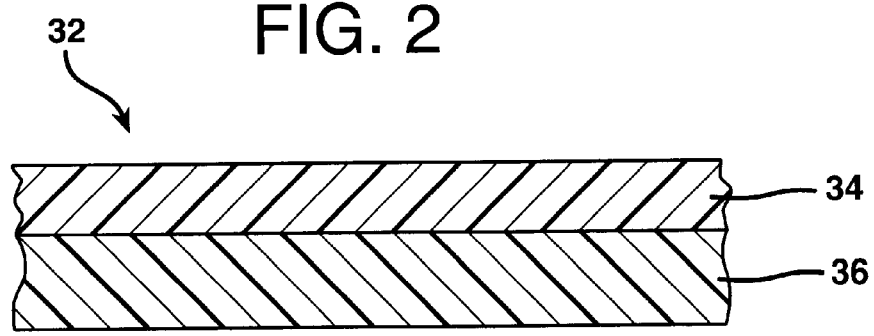
FIG. 2 illustrates an enlarged cross-sectional view of a two-layer film in accord with the present invention.

In FIG. 2, multilayer film 32 comprises outer sealant layer 34 and seal-assist layer 36. Preferably, sealant layer 34 is composed of an ionomer resin, or a substantially homogeneous composition comprising a homogeneous ethylene/alpha-olefin copolymer and a homogeneous ethylene/alpha-olefin copolymer plastomer; preferably, seal-assist layer 36 is composed of a substantially homogeneous composition comprising a homogeneous ethylene/alpha-olefin copolymer and a homogeneous ethylene/alpha-olefin copolymer plastomer. Tables II-A and II-B provide two embodiments for the structural and compositional characteristics of multilayer film 32.

TABLE II-A

| layer designation | layer function | chemical identity | percent of total film thickness |
|---|---|---|---|
| 1 | outer sealant | ionomer | 10 |
| 2 | seal-assist | 65% 0.915 g/cc homogeneous ethylene/alpha-olefin copolymer; 35% 0.87 g/cc homogeneous ethylene/alpha-olefin copolymer plastomer | 90 |

TABLE II-B provides an alternative to the multilayer film described in TABLE II-A.

TABLE II-B

| layer order | layer name | layer function | chemical identity | percent of total film thickness |
|---|---|---|---|---|
| 1 | second | outer sealant | 65% 0.900 g/cc homogeneous ethylene/alpha-olefin copolymer; 35% 0.87 g/cc homogeneous ethylene/alpha-olefin copolymer plastomer | 10 |
| 2 | first | seal-assist | 0.905 g/cc homogeneous ethylene/alpha-olefin copolymer | 90 |

Figure 3:
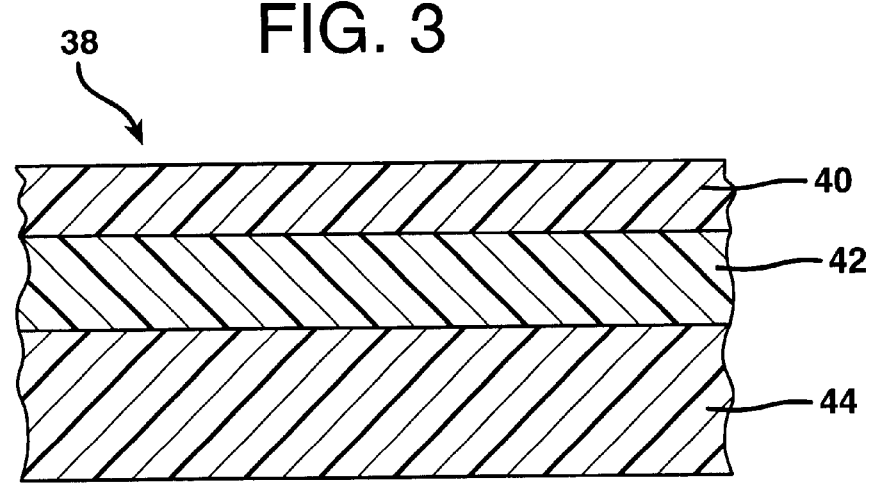
FIG. 3 illustrates an enlarged cross-sectional view of a three-layer film in accord with the present invention.

In FIG. 3, multilayer film 38 comprises outer sealant layer 40, seal-assist layer 42, and bulk layer 44. Preferably, film 38 has a total thickness of from about 0.5 to 8 mils; more preferably, 0.75 to 6 mils, and still more preferably from about 1.5 to 5 mils. Preferably, outer sealant layer 40 is composed of an ionomer resin; preferably, seal-assist layer 42 is composed of a substantially homogeneous composition comprising a homogeneous ethylene/alpha-olefin copolymer and a homogeneous ethylene/alpha-olefin copolymer plastomer; and preferably, bulk layer 44 is composed of a substantially homogeneous blend of linear low density polyethylene and low density polyethylene. Tables III-A and III-B provide the structural and compositional characteristics of preferred embodiments of multilayer film 38.

TABLE III-A

| layer order | layer name | layer function | chemical identity | percent of total film thickness |
|---|---|---|---|---|
| 1 | second | seal | ionomer | 7 |
| 2 | first | seal-assist | 70% 0.900 g/cc homogeneous Et/alpha-olefin; 30% 0.88 g/cc homogeneous plastomer | 20 |
| 3 | third | bulk | 80% 0.920 LLDPE; 20% 0.923 LDPE | 73 |

TABLE III-B provides an alternative to the multilayer film described in TABLE III-A.

TABLE III-B

| layer order | layer name | layer function | chemical identity | percent of total film thickness |
|---|---|---|---|---|
| 1 | second | seal | ionomer | 10 |
| 2 | first | seal-assist | 70% 0.900 g/cc homogeneous Et/alpha-olefin; 30% 0.88 g/cc homogeneous plastomer | 30 |
| 3 | third | bulk | 80% 0.920 LLDPE; 20% 0.923 LDPE | 60 |

Figure 4:
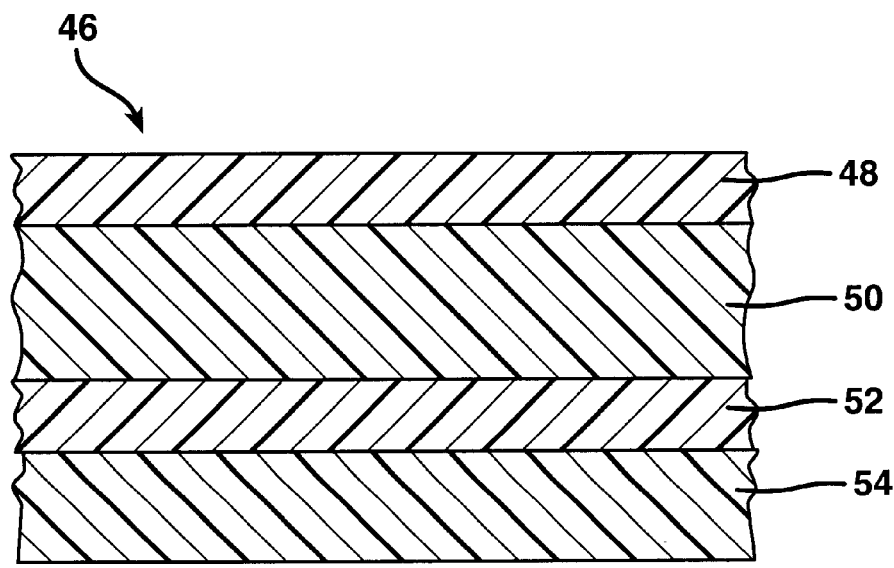
FIG. 4 illustrates an enlarged cross-sectional view of a four-layer film in accord with the present invention.

In FIG. 4, multilayer film 46 comprises outer sealant layer 48, seal-assist layer 50, tie layer 52, and thermoforming and heat-resistant layer 54. Preferably, multilayer film 46 has a total thickness of from about 0.5 to 8 mils; more preferably, 0.75 to 6 mils, and still more preferably about 1.5 to 5 mils. Preferably, outer sealant layer 48 is composed of an ionomer resin; preferably, seal-assist layer 50 is composed of a substantially homogeneous composition comprising a homogeneous ethylene/alpha-olefin copolymer, a homogeneous ethylene/alpha-olefin copolymer plastomer, and low density polyethylene; preferably, tie layer 52 comprises an anhydride-modified grafted linear low density polyethylene; and, preferably thermoforming and heat-resistant layer 54 is composed of polyamide. Table IV provides the structural and compositional characteristics of multilayer film 46.

TABLE IV

| layer order | layer name | layer function | chemical identity | percent of total film thickness |
|---|---|---|---|---|
| 1 | second | outer sealant | ionomer | 8 |
| 2 | first | seal-assist | 55% 0.915 g/cc homogeneous ethylene/alpha-olefin copolymer; 35% 0.23 g/cc homogeneous ethylene/alpha-olefin | 55 |

TABLE IV-continued

| layer order | layer name | layer function | chemical identity | percent of total film thickness |
|---|---|---|---|---|
| | | | copolymer plastomer; 10% LDPE | |
| 3 | fourth | tie | anhydride-modified, grafted LLDPE | 7 |
| 4 | third | thermoforming & heat-resistance | nylon 6 | 30 |

Figure 5:
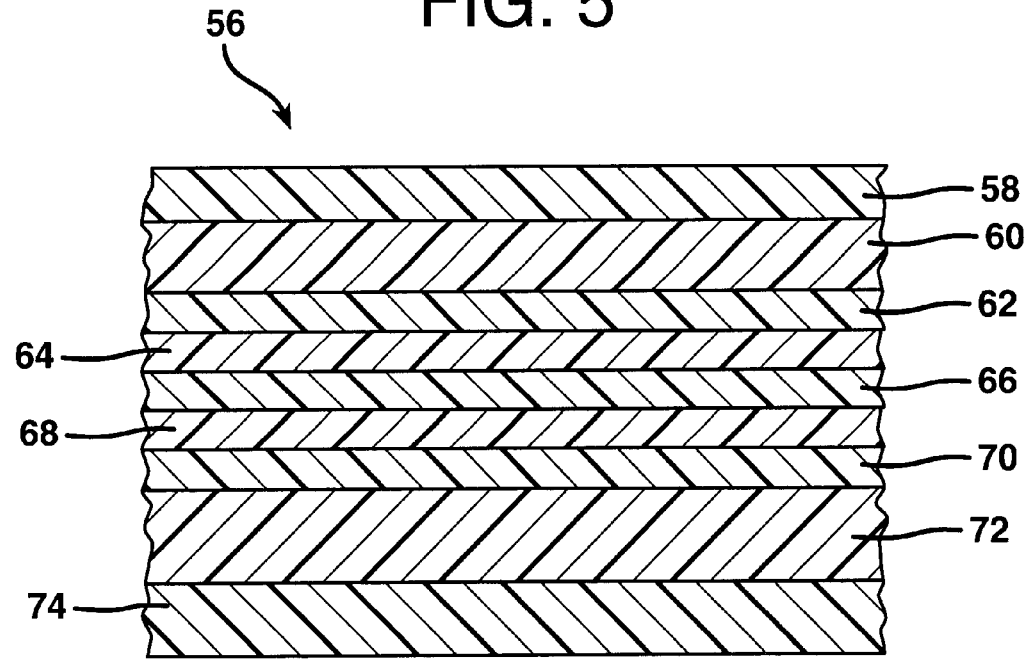
FIG. 5 illustrates an enlarged cross-sectional view of a nine-layer film in accord with the present invention.

In FIG. 5, multilayer film 56 comprises: outer sealant layer 58; seal-assist layer 60; tie layer 62; thermoforming and abuse layer 64; $O_2$ barrier layer 66; thermoforming and abuse layer 68; tie layer 70; thermoforming and abuse layer 72; and thermoforming and heat-resistant layer 74. Preferably, multilayer film 56 has a total thickness of from about 0.5 to 8 mils; more preferably, 0.75 to 6 mils, and still more preferably from about 1.5 to 5 mils. Preferably, outer sealant layer 58 is composed of an ionomer resin; preferably, seal-assist layer 60 is composed of a substantially homogeneous composition comprising a homogeneous ethylene/alpha-olefin copolymer, a homogeneous ethylene/alpha-olefin copolymer plastomer, and low density polyethylene; preferably, tie layer 62 is composed of anhydride-modified grafted linear low density polyethylene; preferably, thermoforming and abuse layer 64 is composed of polyamide; preferably, $O_2$ barrier layer 66 is composed of ethylene/vinyl alcohol copolymer; preferably, thermoforming and abuse layer 68 is composed of polyamide; preferably tie layer 70 is composed of anhydride-modified grafted linear low density polyethylene; preferably, thermoforming and abuse layer 72 is composed of ethylene/propylene copolymer; and preferably, thermoforming and heat-resistant layer 74 is composed of propylene homopolymer. Table V-A provides the structural and compositional characteristics of multilayer film 56.

TABLE V-A

| layer order | layer name | layer function | chemical identity | percent of total film thickness |
|---|---|---|---|---|
| 1 | second | heat seal | ionomer | 8 |
| 2 | first | seal-assist | 55% 0.915 g/cc homogeneous ethylene/alpha-olefin; 35% 0.87 g/cc homogeneous ethylene/alpha-olefin plastomer; 10% 0.923 g/cc LDPE | 20 |
| 3 | fourth | tie | anhydride-modified, grafted LLDPE | 10 |
| 4 | fifth | thermoforming & abuse | blend of 85% nylon 6 & 15% amorphous nylon | 6 |
| 5 | third | oxygen barrier | EVOH | 6 |
| 6 | sixth | thermoforming & abuse | blend of 85% nylon 6 & 15% amorphous nylon | 6 |
| 7 | eighth | tie | anhydride-modified grafted LLDPE | 7 |
| 8 | ninth | thermoforming & abuse | ethylene/propylene copolymer | 22 |
| 9 | seventh | heat-resistance, & thermoforming | propylene homopolymer | 15 |

TABLE V-B provides an alternative to the multilayer film described in TABLE V-A.

TABLE V-B

| layer order | layer name | layer function | chemical identity | percent of total film thickness |
|---|---|---|---|---|
| 1 | first | outer seal | 65% 0.900 g/cc homogeneous Et/alpha-olefin; 35% 0.87 g/cc homogeneous ethylene/alpha-olefin plastomer | 10 |
| 2 | second | seal-assist | 65% 0.915 g/cc homogeneous ethylene/alpha-olefin; 35% 0.87 g/cc homogeneous ethylene/alpha-olefin plastomer; | 20 |
| 3 | sixth | tie | anhydride-modified, grafted LLDPE | 10 |
| 4 | fourth | thermoforming & abuse | blend of 85% nylon 6 & 15% amorphous nylon | 6 |
| 5 | third | $O_2$ barrier | EVOH | 6 |
| 6 | fifth | thermoforming & abuse | 85% nylon 6; 15% amorphous nylon | 6 |
| 7 | eighth | tie | anhydride-modified grafted LLDPE | 7 |
| 8 | ninth | thermoforming & abuse | ethylene/propylene copolymer | 25 |
| 9 | seventh | heat-resistance, & thermoforming | propylene homopolymer | 10 |

Figure 6:
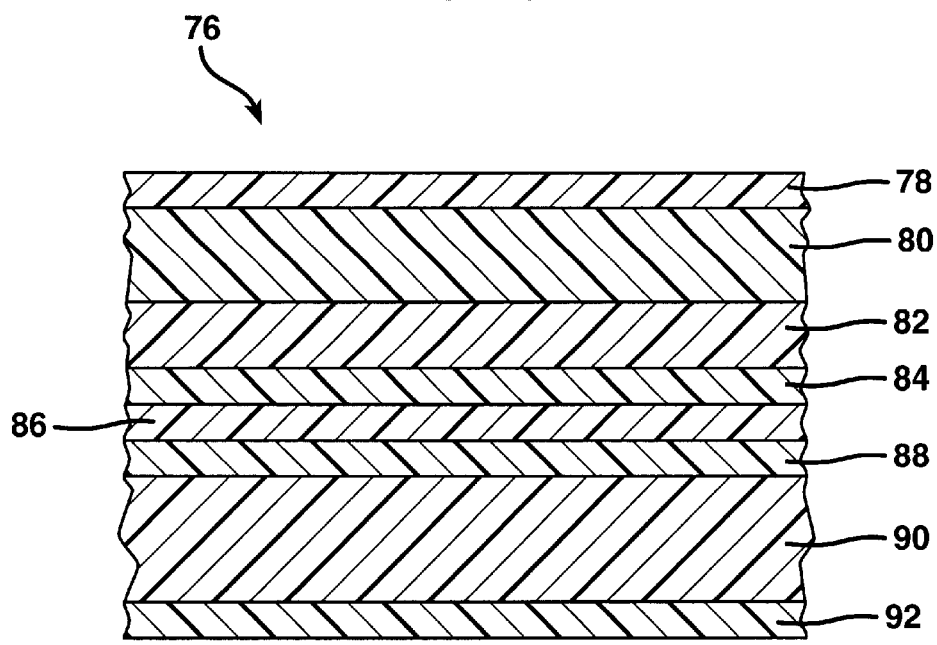
FIG. 6 illustrates an enlarged cross-sectional view of an eight-layer film in accord with the present invention.

In FIG. 6, multilayer film 76 comprises: outer sealant layer 78; seal-assist layer 80; tie layer 82; thermoforming, abuse, and ultraviolet-protection layer 84; $O_2$ barrier layer 86; thermoforming, abuse, and ultraviolet-protection layer 88; tie layer 90; thermoforming, abuse, and heat-resistant layer 92. Preferably, multilayer film 76 has a total thickness of from about 0.5 to 15 mils; more preferably, 1 to 10 mils, and still more preferably from about 2 to 8 mils. Preferably, outer sealant layer 78 is composed of an ionomer resin; preferably, seal-assist layer 80 is composed of a substantially. homogeneous composition comprising a homogeneous ethylene/alpha-olefin copolymer, a homogeneous ethylene/alpha-olefin copolymer plastomer, and low density polyethylene; preferably, tie layer 82 is composed of anhydride-modified grafted linear low density polyethylene; preferably, thermoforming, abuse, and ultraviolet-protection layer 84 is composed of polyamide; preferably, $O_2$ barrier layer 86 is composed of ethylene/vinyl alcohol copolymer; preferably, thermoforming, abuse, and ultraviolet-protection layer 88 is composed of polyamide; preferably tie layer 90 is composed of anhydride-modified grafted low density polyethylene; preferably, thermoforming, abuse, and heat-resistant layer 92 is composed of ethylene/propylene copolymer.

Table VI provides the structural and compositional characteristics of multilayer film 76.

TABLE VI

| layer order | layer name | layer function | chemical identity | percent of total film thickness |
|---|---|---|---|---|
| 1 | second | heat seal | ionomer | 8 |
| 2 | first | seal-assist | 55% 0.915 g/cc homogeneous ethylene/alpha-olefin; 35% 0.87 g/cc homogeneous ethylene/alpha-olefin plastomer; 10% 0.923 g/cc LDPE | 20 |
| 3 | seventh | tie | anhydride-modified, grafted LLDPE | 11 |
| 4 | fifth | thermoforming, abuse, & uv protection | blend of 85% nylon 6 & 15% amorphous nylon | 6 |
| 5 | third | oxygen barrier | EVOH | 6 |
| 6 | sixth | thermoforming, abuse, & uv protection | blend of 85% nylon 6 & 15% amorphous nylon | 6 |
| 7 | eighth | tie | anhydride-modified grafted LDPE | 35 |
| 8 | fourth | thermoforming, abuse, and heat-resistance | nylon 6 | 8 |

Figure 7:
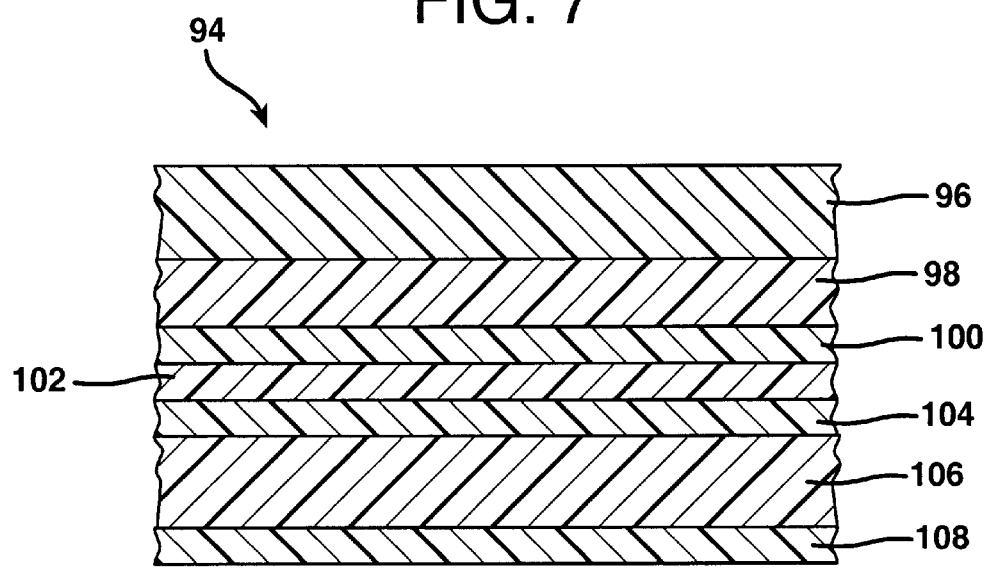
FIG. 7 illustrates an enlarged cross-sectional view of a seven-layer film in accord with the present invention.

In FIG. 7, multilayer film 94 comprises: sealant layer 96; tie layer 98; thermoforming, abuse, and ultraviolet-protection layer 100; $O_2$ barrier layer 102; thermoforming, abuse, and ultraviolet-protection layer 104; tie layer 106; and thermoforming, abuse, and heat-resistant layer 108. Preferably, multilayer film 94 has a total thickness of from about 0.5 to 15 mils; more preferably, 1 to 10 mils, and still more preferably from about 2 to 8 mils. Preferably, sealant layer 96 is composed of a substantially homogeneous composition comprising a homogeneous ethylene/alpha-olefin copolymer, a homogeneous ethylene/alpha-olefin copolymer plastomer, and low density polyethylene; preferably, tie layer 98 is composed of anhydride-modified grafted linear low density polyethylene; preferably, thermoforming, abuse, and ultraviolet-protection layer 100 is composed of polyamide; preferably, $O_2$ barrier layer 102 is composed of ethylene/vinyl alcohol copolymer; preferably, thermoforming, abuse, and ultraviolet-protection layer 104 is composed of polyamide; preferably, tie layer 106 is composed of anhydride-modified grafted ethylene/vinyl acetate copolymer; preferably, thermoforming, abuse, and heat-resistant layer 108 is composed of polyamide.

Table VII provides the structural and compositional characteristics of multilayer film 94.

TABLE VII

| layer order | layer name | layer function | chemical identity | percent of total film thickness |
|---|---|---|---|---|
| 1 | first | seal | 55% 0.900 g/cc homogeneous ethylene/alpha-olefin; 35% 0.86 g/cc EPDM elastomer; 10% 0.923 g/cc LDPE | 25 |
| 2 | third | tie | anhydride-modified, grafted LLDPE | 12 |
| 3 | fourth | thermoforming, abuse, & uv protection | 85% nylon 6; 15% amorphous nylon | 10 |
| 4 | second | $O_2$ barrier | EVOH | 8 |
| 5 | sixth | thermoforming, abuse, & uv protection | 85% nylon 6; 15% amorphous nylon | 10 |
| 6 | seventh | tie | anhydride-modified grafted EVA | 25 |

TABLE VII-continued

| layer order | layer name | layer function | chemical identity | percent of total film thickness |
|---|---|---|---|---|
| 7 | fifth | thermoforming, abuse, and heat-resistance | nylon 6 | 10 |

Figure 8:
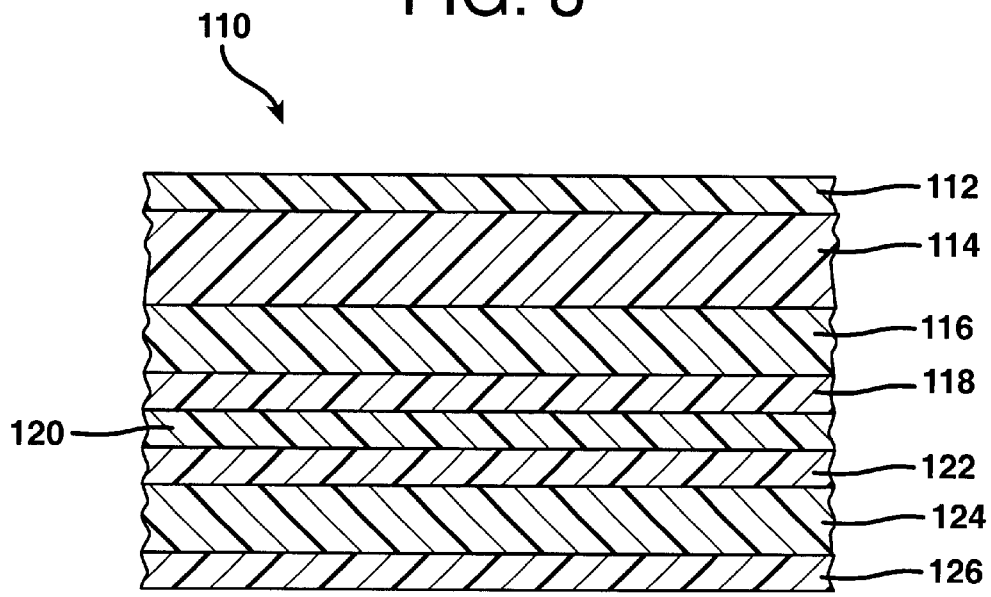
FIG. 8 illustrates an enlarged cross-sectional view of an alternative eight-layer film in accord with the present invention.

In FIG. 8, multilayer film 110 comprises: outer sealant layer 112; seal-assist layer 114; tie layer 116; thermoforming and abuse layer 118; tie layer 120; thermoforming and abuse layer 122; tie layer 124; and, thermoforming, abuse, and heat-resistant layer 126. Preferably, multilayer film 110 has a total thickness of from about 0.5 to 15 mils; more preferably, 1 to 10 mils, and still more preferably from about 2 to 8 mils. Preferably, outer sealant layer 112 is composed of an ionomer resin; preferably, seal-assist layer 114 is composed of a substantially homogeneous composition comprising a homogeneous ethylene/alpha-olefin copolymer, a homogeneous ethylene/alpha-olefin copolymer plastomer, and low density polyethylene; preferably, tie layer 116 is composed of homogeneous ethylene/alpha-olefin copolymer and anhydride-modified grafted low density polyethylene; preferably, thermoforming and abuse layer 118 is composed of polyamide; preferably, tie layer 120 is composed of anhydride-grafted ethylene/vinyl acetate copolymer; preferably, thermoforming and abuse layer 122 is composed of polyamide; preferably tie layer 124 is composed of anhydride-modified grafted ethylene/vinyl acetate copolymer; preferably, thermoforming, abuse, and heat-resistant layer 126 is composed of polyamide.

Table VIII provides the structural and compositional characteristics of multilayer film 110.

TABLE VIII

| layer order | layer name | layer function | chemical identity | percent of total film thickness |
|---|---|---|---|---|
| 1 | second | seal | ionomer | 8 |
| 2 | first | seal-assist | 55% 0.915 g/cc homogeneous ethylene/alpha-olefin; 35% 0.87 g/cc homogeneous ethylene/alpha-olefin plastomer; 10% 0.923 g/cc LDPE | 27 |
| 3 | seventh | tie | 80% 0.915 g/cc homogeneous ethylene/alpha olefin copolymer; 20% anhydride-modified LDPE | 12 |
| 4 | fifth | thermoforming & abuse | nylon 6 | 10 |
| 5 | third | tie | anhydride-grafted EVA | 11 |
| 6 | sixth | thermoforming & abuse | nylon 6 | 10 |
| 7 | eighth | tie | anhydride-grafted EVA | 12 |
| 8 | fourth | thermoforming, abuse, & heat-resistance | copolymer of 85% nylon 6/ 15% nylon 66 | 10 |

Figure 9:
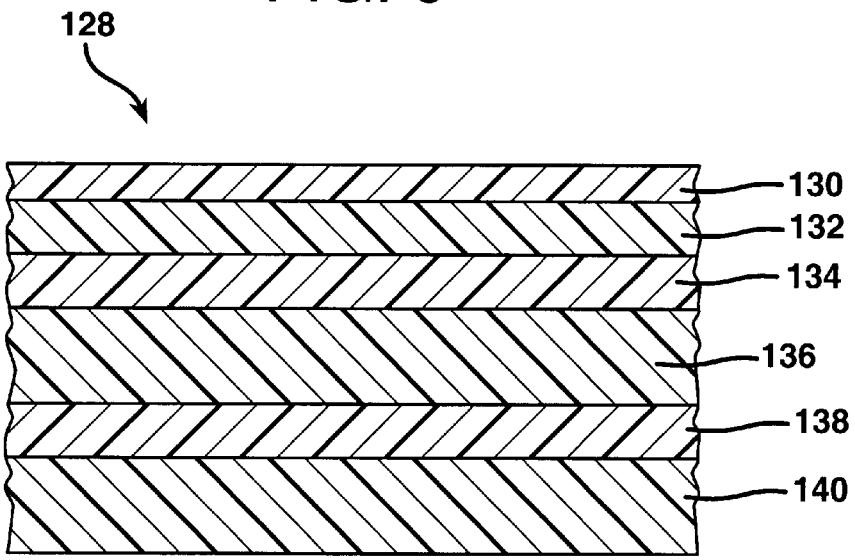
FIG. 9 illustrates an enlarged cross-sectional view of a six-layer film in accord with the present invention.

In FIG. 9, multilayer film 128 comprises: outer sealant and food-contact layer 130; seal-assist layer 132; tie layer 134; memory layer 136; tie layer 138; and non-contact seal layer 140. Preferably, multilayer film 128 has a total thickness of from about 0.5 to 15 mils; more preferably, 1 to 10 mils, and still more preferably from about 2 to 8 mils. Preferably, outer sealant and food-contact layer 130 is composed of an ionomer resin; preferably, seal-assist layer 132 is composed of a substantially homogeneous composition comprising a homogeneous ethylene/alpha-olefin copolymer and a homogeneous ethylene/alpha-olefin copolymer plastomer; preferably, tie layer 134 is composed of anhydride-modified grafted linear low density polyethylene; preferably, memory layer 136 is composed of polyamide; preferably, tie layer 138 is composed of anhydride-grafted linear low density polyethylene; preferably, non-contact sealant layer 140 is composed of a substantially homogeneous composition comprising a homogeneous ethylene/alpha-olefin copolymer and a homogeneous ethylene/alpha-olefin copolymer plastomer.

Table IX provides the structural and compositional characteristics of multilayer film 128.

TABLE IX

| layer order | layer name | layer function | chemical identity | percent of total film thickness |
|---|---|---|---|---|
| 1 | first | seal & food contact | ionomer | 8 |
| 2 | third | seal-assist | 65% 0.915 g/cc homogeneous ethylene/alpha-olefin copolymer; 35% 0.87 g/cc homogeneous ethylene/alpha-olefin plastomer | 17 |
| 3 | fifth | tie | anhydride-grafted LLDPE | 15 |
| 4 | fourth | memory | nylon 6 | 25 |
| 5 | sixth | tie | anhydride-grafted LLDPE | 15 |
| 6 | second | non-contact seal | 65% 0.915 g/cc homogeneous ethylene/ alpha-olefin; 35% 0.87 g/cc homogeneous ethylene/alpha-olefin plastomer | 20 |

The films according to the present invention are suited to many different forms of packaging applications, such as bags, casings, forming stock (suitable for thermoforming), and lidstock, including both heat-shrinkable as well as non-heat-shrinkable films for all of these applications. However, the films illustrated in Although in general the film and package according to the present invention can be used in the packaging of any product, the film and package of the present invention are especially advantageous for the packaging of food products, especially food products packaged in: (a) thermoformed webs having a lidstock sealed thereto, especially thermoformed packages containing meat products, the package being used in a cook-in application; (b) bags, especially bags used in vacuum packaging; (c) casings, especially casings used to package processed meats, such as shirred casings, which can optionally also be used in cook-in applications. Among the meat products which can be packaged in the films and packages according to the present invention are poultry, pork, beef, lamb, goat, horse, and fish.

Figure 10:
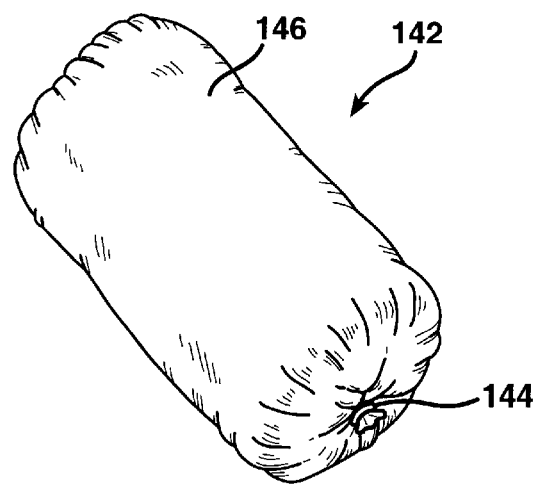
FIG. 10 illustrates a perspective view of a packaged product according to the present invention.

FIG. 10 illustrates one embodiment of a packaged product 142 of the present invention, the product being packaged in a casing closed by a pair of clips 144 at each end thereof, with only one being illustrated in FIG. 10. Film 146, used to package the meat product therewithin, can be, for example, multilayer film 128 illustrated in FIG. 9, discussed in detail above. In FIG. 10, the cooked meat product preferably comprises processed poultry, processed beef, and/or processed pork.

Figure 11:
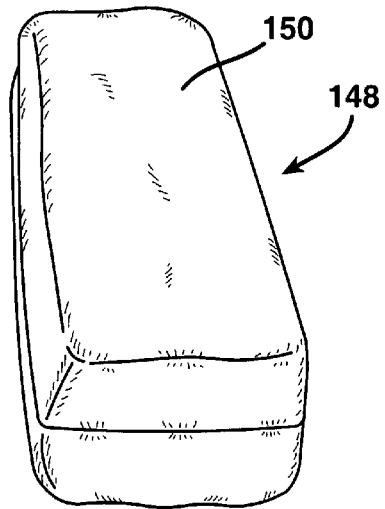
FIG. 11 illustrates a perspective view of an alternative packaged product according to the present invention.

FIG. 11 illustrates another embodiment of a packaged product 148, according to the present invention. The product, a cooked meat product, is packaged in a heat-sealed, heat-shrinkable bag, within which the meat product has been cooked. The package comprises multilayer film 150. In FIG. 11, the cooked meat product preferably comprises pork, in the form of a boneless ham.

Figure 12:
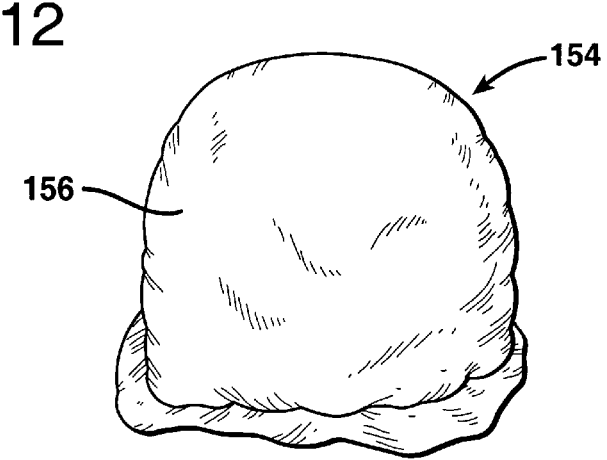
FIG. 12 illustrates a perspective view of another packaged product in accordance with the present invention.

FIG. 12 illustrates yet another embodiment of a packaged product 154, according to the present invention. The product, a cooked meat product, is packaged in a heat-sealed, thermoformed web having a lidstock web sealed thereto, with the meat product being cooked within the sealed thermoformed package. The package comprises multilayer film 156, which can be, for example, multilayer film 76 illustrated in FIG. 6, or multilayer film 56 illustrated in FIG. 5, both of which are discussed in detail above. In FIG. 11, the cooked meat product comprises poultry, more specifically, a boneless turkey breast product.

Figure 13:
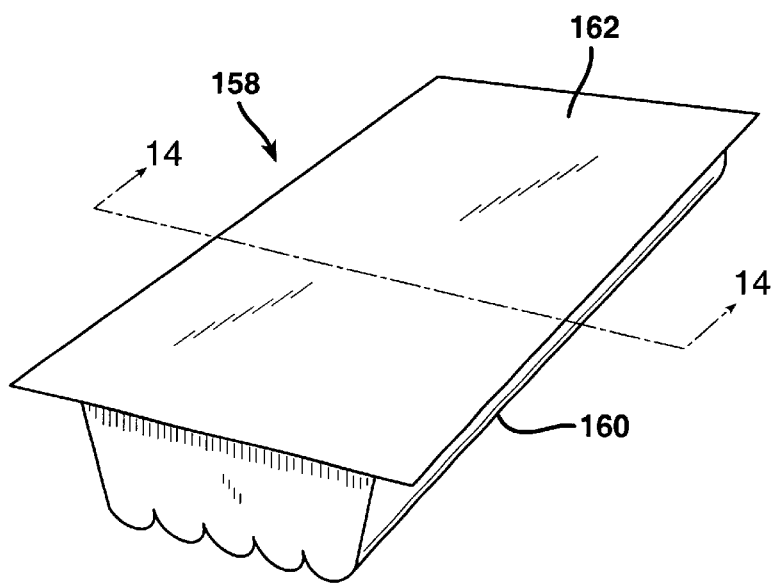
FIG. 13 illustrates a perspective view of another alternative packaged product according to the present invention.

FIG. 13 illustrates yet another embodiment of a packaged product 158, according to the present invention. The product, a cooked meat product (e.g., hot dogs), is packaged in heat-sealed, thermoformed web 160 having lidstock web 162 sealed thereto. Thermoformed web 160 can be, for example, multilayer film 46 illustrated in FIG. 4, or multilayer film 56 illustrated in FIG. 5, both of which are discussed in detail above. Lidstock 162 can be, for example, multilayer film 94 illustrated in FIG. 7, or multilayer film 110 illustrated in FIG. 8, both of which are discussed in detail above.

Figure 14:
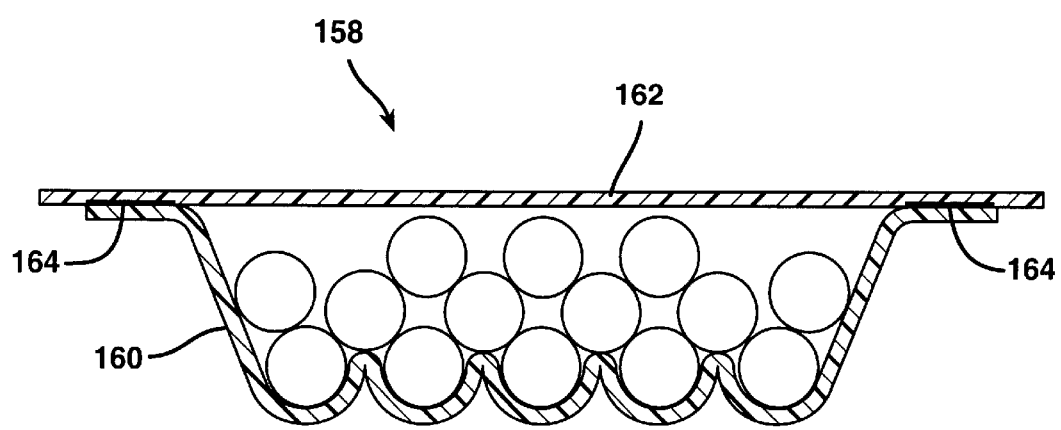
FIG. 14 illustrates a cross-sectional view, through section 14—14, of the packaged product illustrated in FIG. 13.

FIG. 14 illustrates a cross-sectional view of packaged product 158 of FIG. 13, taken through section 14—14 of FIG. 14. FIG. 14 illustrates lidstock web 162 making up the top of the package, and thermoformed web 160 making up the bottom and sides of the package, and seal 164 of thermoformed web 160 to lidstock web 162, seal 164 being around the top of packaged product 158.

Figure 15:
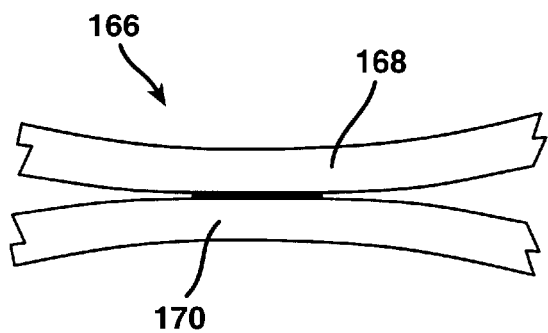
FIG. 15 illustrates a cross-sectional view of a generic seal used in a package.

FIG. 15 represents an enlarged cross-sectional view of a seal 166 used in the package according to the present invention. First film region 168 is sealed to second film region 170 at seal 172. Seal 172 is produced by heating the first film region 168 and second film region 170 in order to cause the contacting portions of the films to simultaneously melt and flow together.

Figure 16:
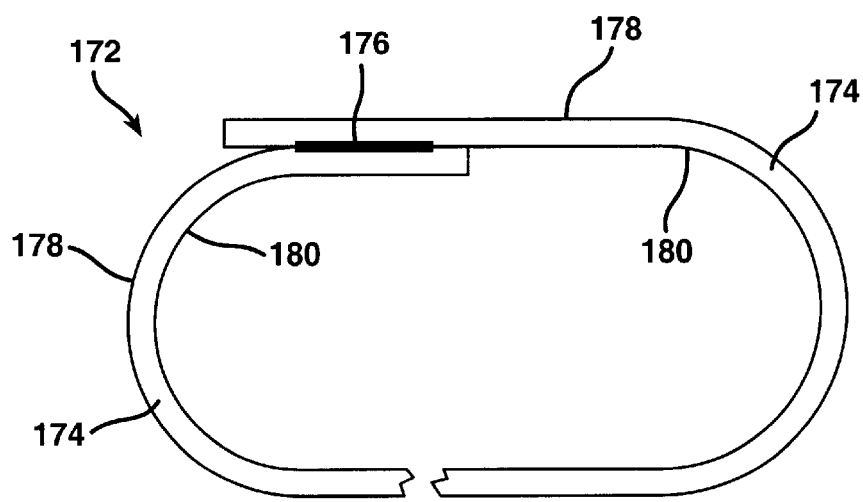
FIG. 16 illustrates a cross-sectional view of a lap seal.

FIG. 16 represents an enlarged cross-sectional view of a lap-sealed film tube 172. Film 174 is formed into a tube, and lap seal 176 is formed along the length of the tube. Such seals as seal 176 are termed "lap seals" because the film is lapped over itself, with the outside surface 178 of the film being sealed to the inside surface 180 of the film, at lap seal 176.

Figure 17:
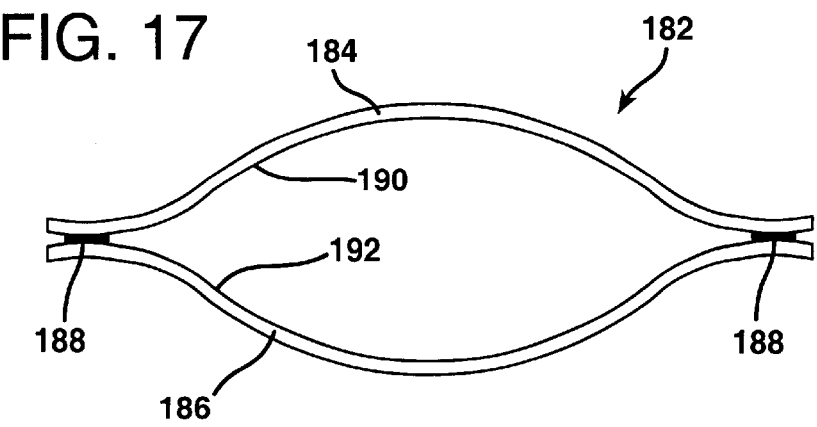
FIG. 17 illustrates a cross-sectional view of a package comprising a fin seal.

FIG. 17 represents an enlarged cross-sectional view of a package 182, such as a cross-section of a vertical form fill and seal package, having a first film 184 sealed to second film 186 via a pair of fin seals 188. Seals such as 188 are termed "fin seals" because, unlike lap seals, they protrude from the package, much as the fin of a fish protrudes from its body. As can be seen, both of the fin seals 188 of package 182 are a seal of inside surface 190 of first film 184 to inside surface 192 of second film 186.

Figure 18:
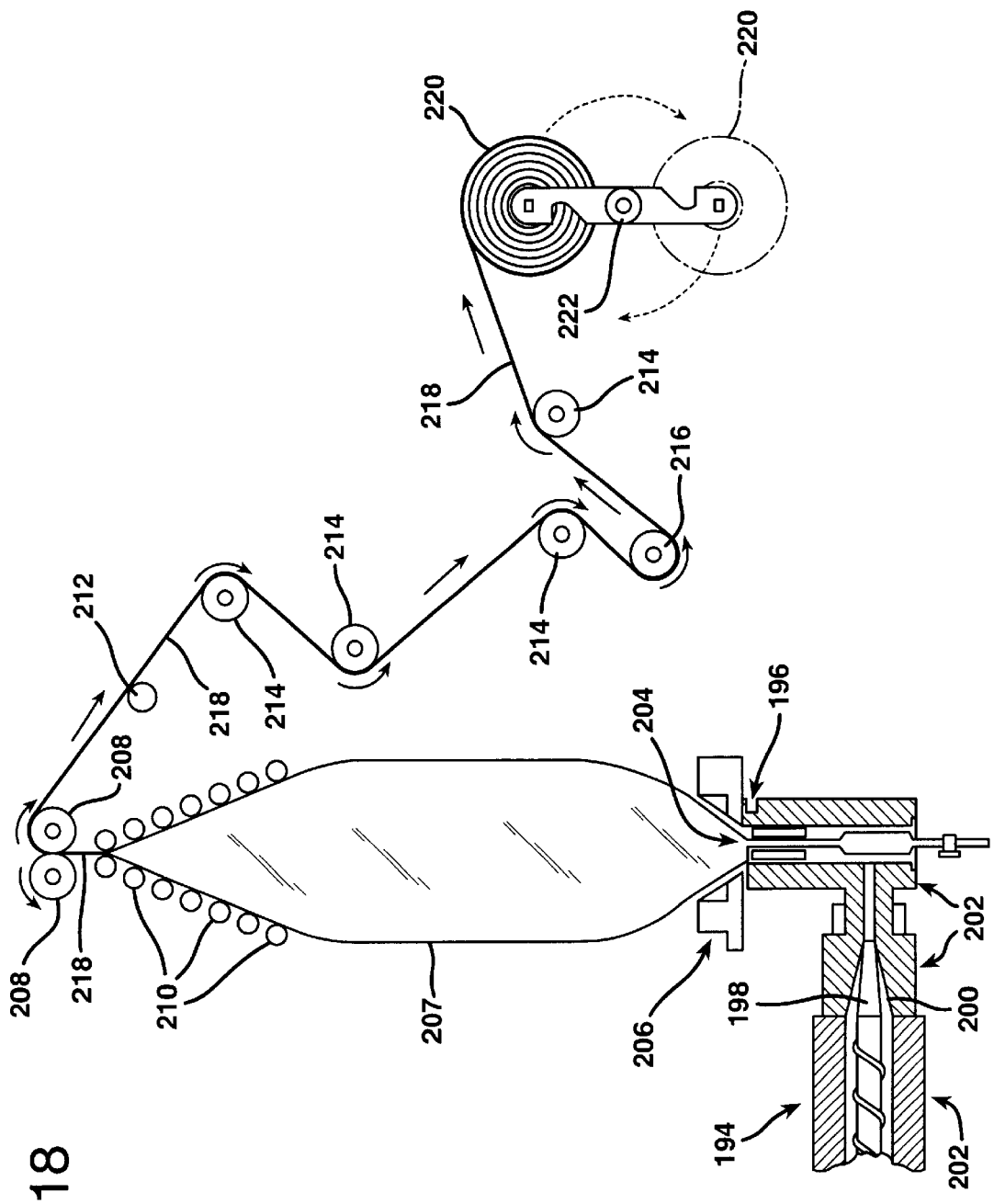
FIG. 18 illustrates a schematic view of a preferred process for making preferred multilayer films.

FIG. 18 illustrates a schematic view of a process useful in making films according the present invention. Although for the sake of simplicity only one extruder 194 is illustrated in FIG. 18, there are preferably at least two extruders, and more preferably, at least three extruders. That is, preferably at least one extruder, and more preferably two extruders, supply molten polymer to coextrusion die 196 for the formation of, for example, outer layers 40 and 44 of the three-layer film illustrated in FIG. 3; and at least one additional extruder to supply molten polymer to coextrusion die 196 for the formation of, for example, core layer 42 in the three-layer film illustrated in FIG. 3. Each of the extruders is supplied with polymer pellets suitable for the formation of the respective layer it is extruding. The extruders subject the polymer pellets to sufficient pressure and heat to melt the polymer and thereby prepare it for extrusion through a die.

Taking extruder 194 as an example, each of the extruders is preferably equipped with a screen pack 198, a breaker plate 200, and a plurality of heaters 202. Each of the coextruded film layers is extruded between mandrel 204 and die 196, and the extrudate is cooled by cool air flowing from air ring 206. The resulting blown bubble 207 is thereafter guided into a collapsed configuration by nip rolls 208, via guide rolls 210. The collapsed tube is optionally passed over treater. bar 212, and is thereafter passed over idler rolls 214, and around dancer roll 216 which imparts tension control to collapsed tube 218, after which the collapsed tube is wound into roll 220 via winding mechanism 222.

Figure 19:
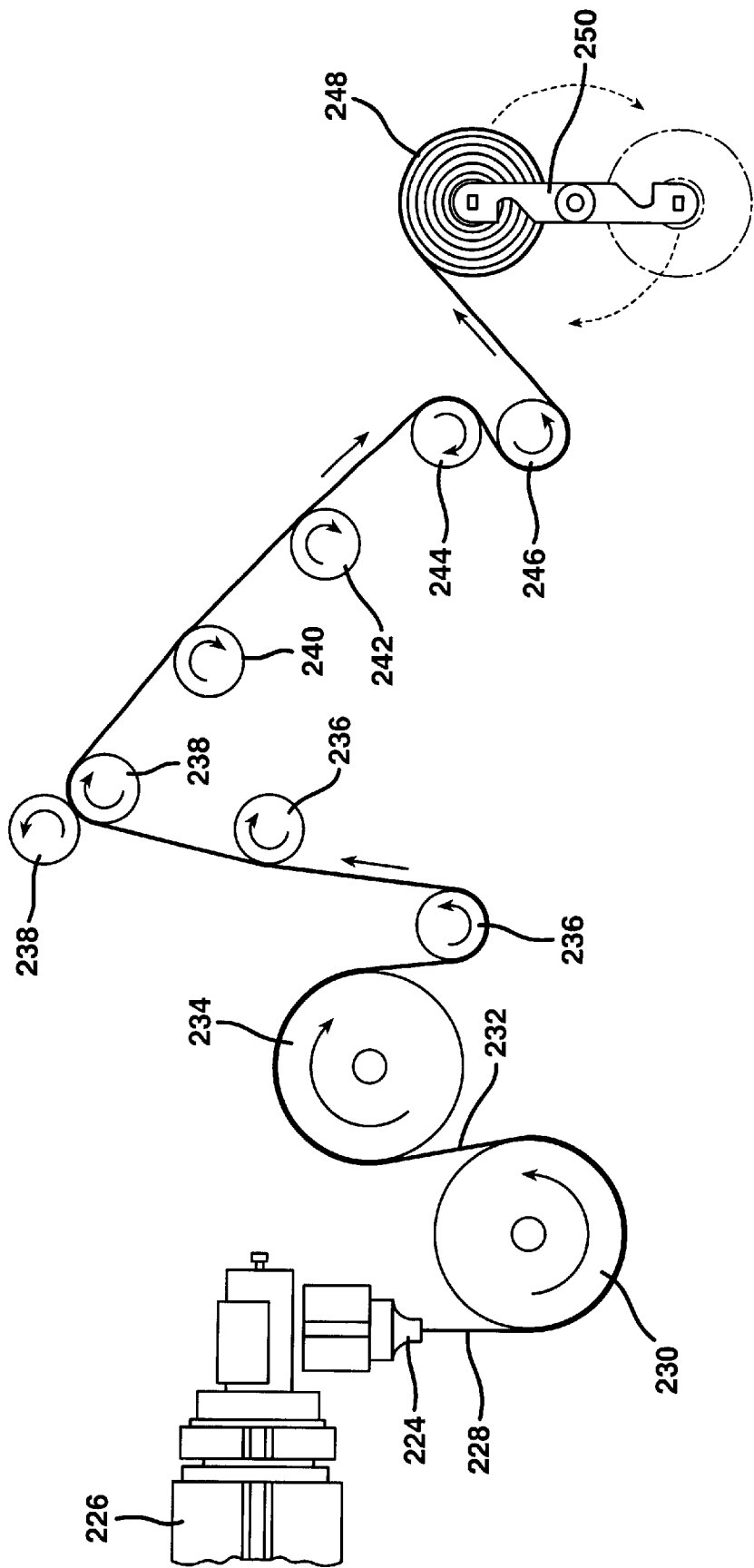
FIG. 19 illustrates a schematic view of another preferred process for making preferred multilayer films.

FIG. 19 illustrates a schematic view of a cast coextrusion process of film manufacture, in which various polymeric formulations are supplied to slot-shaped die 224 from a plurality (preferably, from 3 to 10) of extruders 226, only one of which is illustrated in FIG. 7. The number of extruders 226 is at least as great as the number of different chemical compositions present in the various layers of the multilayer film, but can be fewer than the number of layers of the film in the event that a stream from an extruder is split to form two different film layers. Typically, the extruders are single screw extruders which convert polymer granules or pellets.into a continuous uniform melt under elevated temperatures and pressure. The molten masses formed within the various extruders are converged into a plurality of layers in a stream which is forced into flat laminar flow. for the width of the slot of die 224, and thereafter forced through the slot of die 224, to yield the desired shape. After passing through the slot of die 224, melt 228 passes downward vertically and tangentially contacts chill roll 230 which quenches melt 228, forming multilayer film 232 thereon. Chill roll 230 is highly polished and water-cooled, and rotates with melt 228 at the speed at which melt 228, and film 232, are drawn forward. Film 232 then leaves the surface of chill roll 230, and thereafter may contact the surface of from one to three supplemental chill rolls 234 (only one supplemental chill roll 234 is illustrated in FIG. 19), which are also water-cooled and highly polished, and which further cool multilayer film 232, which thereafter passes over guide rolls 236 and through the nip of nip rolls 238. Film 232 is thereafter directed over guide rolls 240 and 242. Thereafter, film 232 passes between a nip between rubber nip roll 244 and stainless steel nip roll 246, and is then wound up into roll 248 by winder 250. The width of the cast film web is determined by the die slot width. The thickness of film 232 is determined by the relationship between the output of extruder 226 and the takeaway speed of the film 232.

Figure 20:
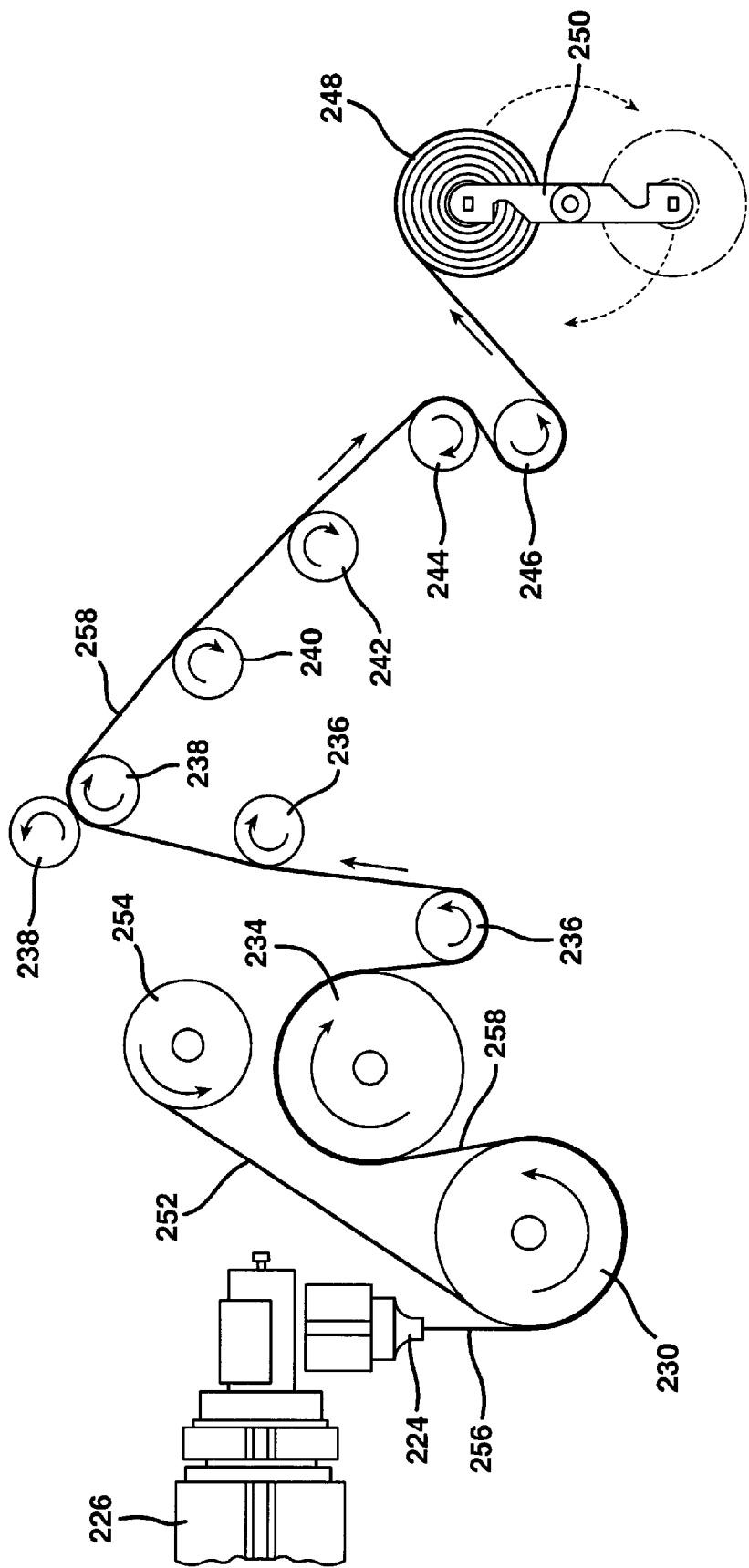
FIG. 20 illustrates a schematic view of another preferred process for making preferred multilayer films.

In FIG. 20, substrate film 252, supplied from roll 254, is directed onto chill roll 230 and coated with molten coating 256 passing vertically downward from slot die 224 towards chill roll 230. Coating 256 is cooled by chill roll 230, the heat from coating 256 passing through substrate film 252 and into chill roll 230, to result in coated substrate 258. Furthermore, if additional downstream chill rolls are present, such as chill roll 234, further cooling can be effected by direct contact of coating 256 with the smooth surface of the chill roll, i.e., without substrate film 252 between coating 256 and the chill roll. Subsequent downstream processing of coated substrate 258 is the same as described in FIG. 19.

Figure 21:
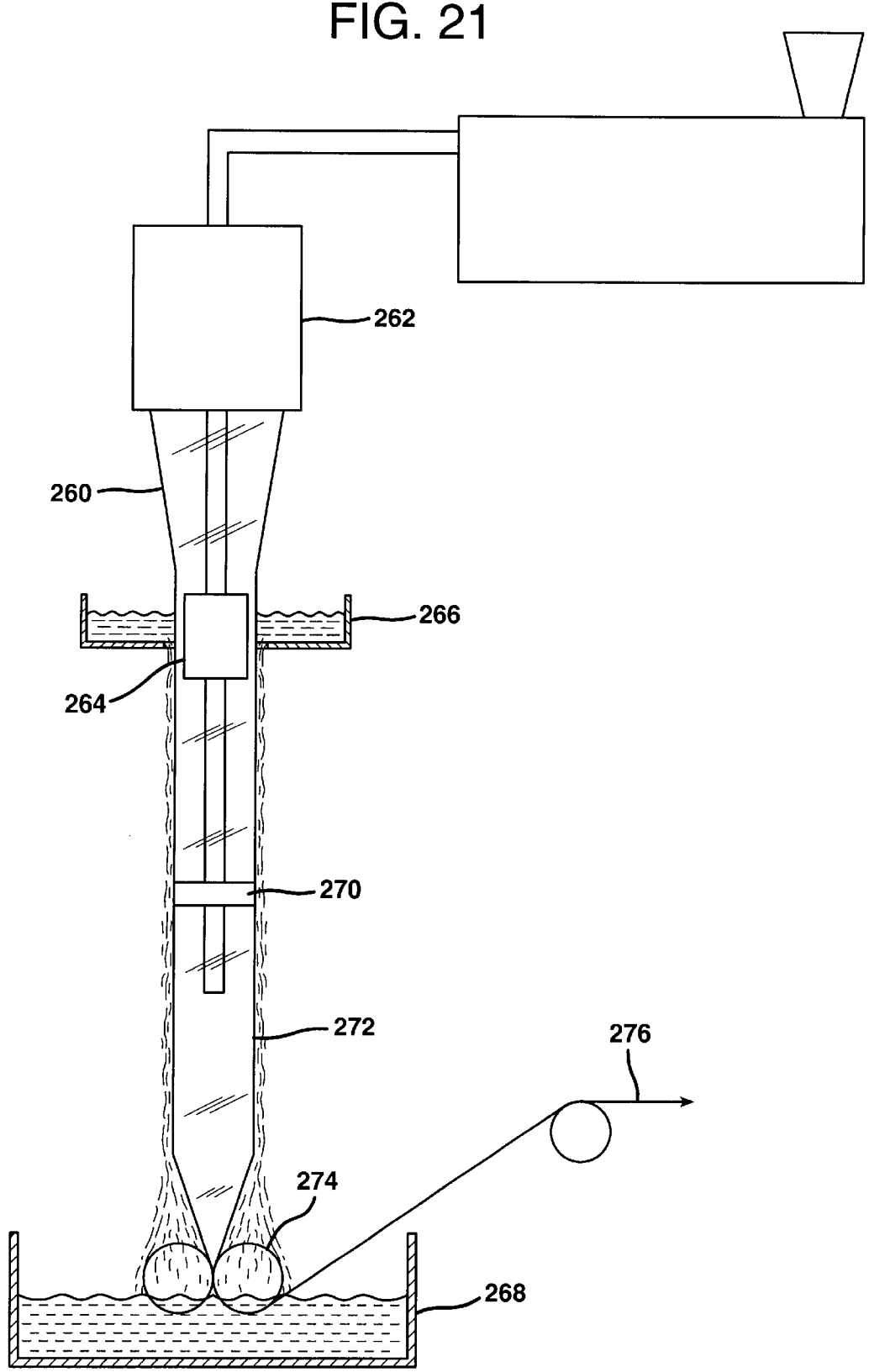
FIG. 21 illustrates a schematic view of another preferred process for making preferred multilayer films.
Figure 22:
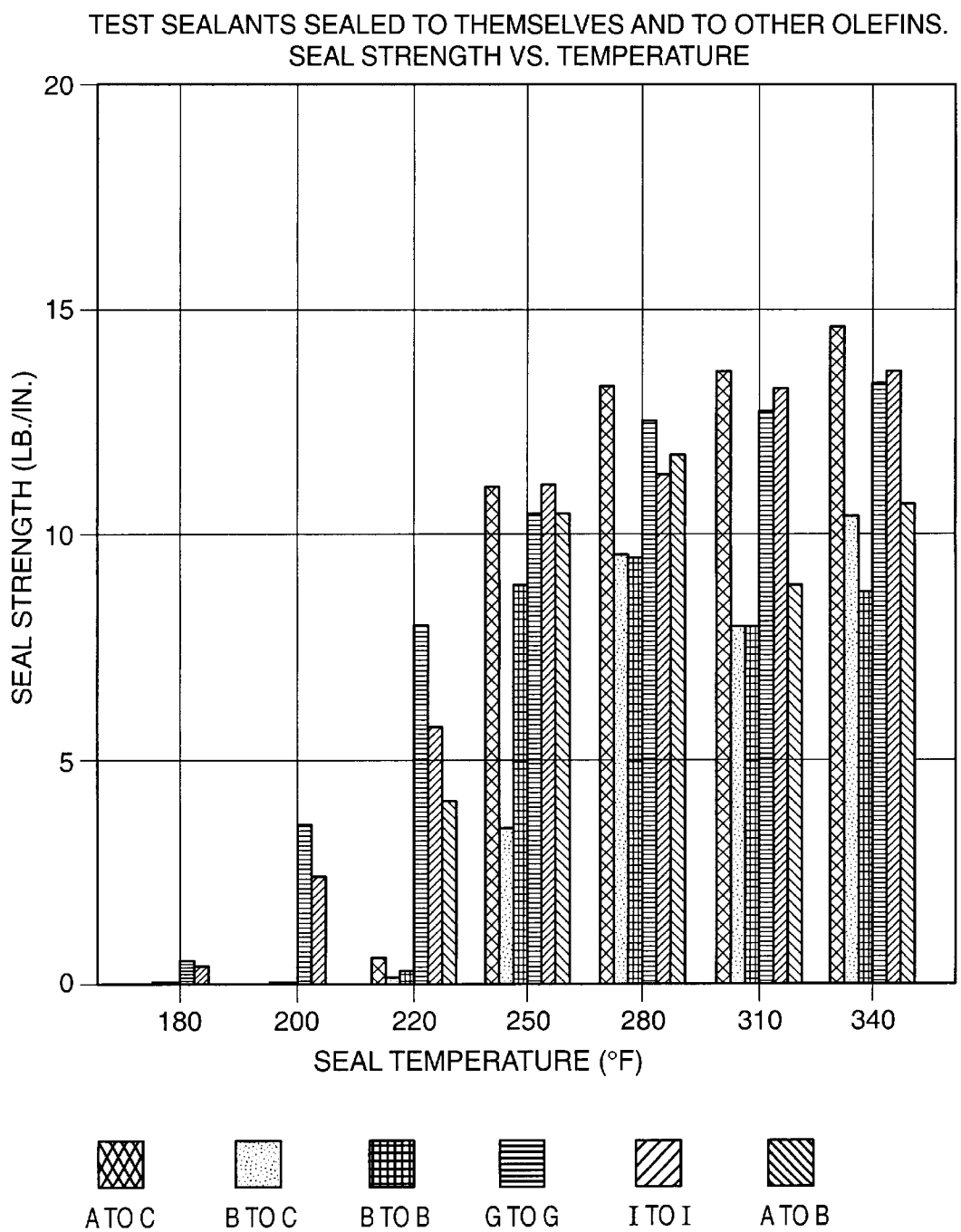
FIG. 22 is a bar graph representation of seal temperature (° F.) vs. seal strength (lb/in) results, and provides comparative data for the seal strengths of several sealants versus temperature.
Figure 23:
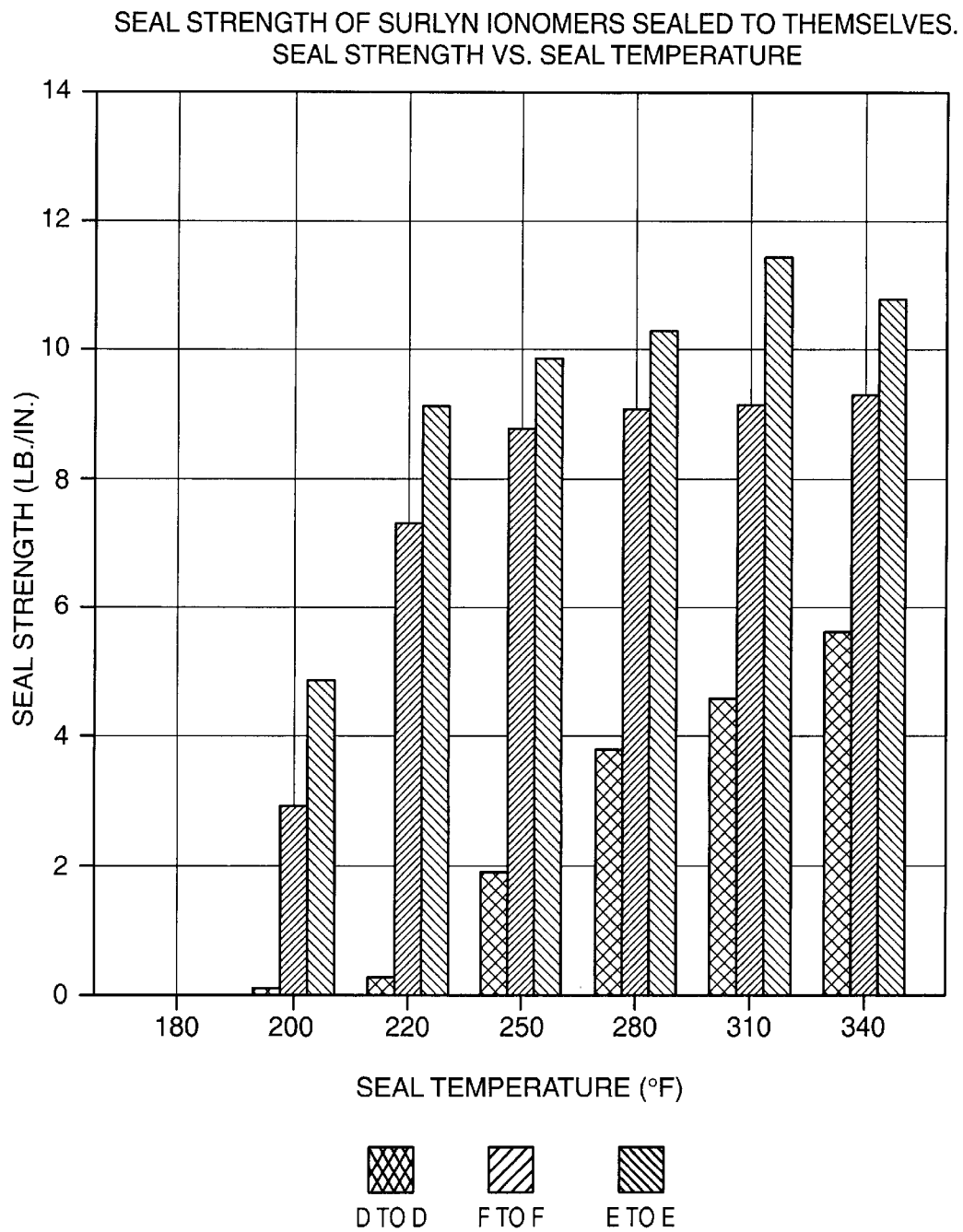
FIG. 23 is a bar graph representation of seal temperature (° F.) vs. seal strength (lb/in) results, and provides comparative data for the seal strength of various ionomer resins as a function of temperature.
Figure 24:
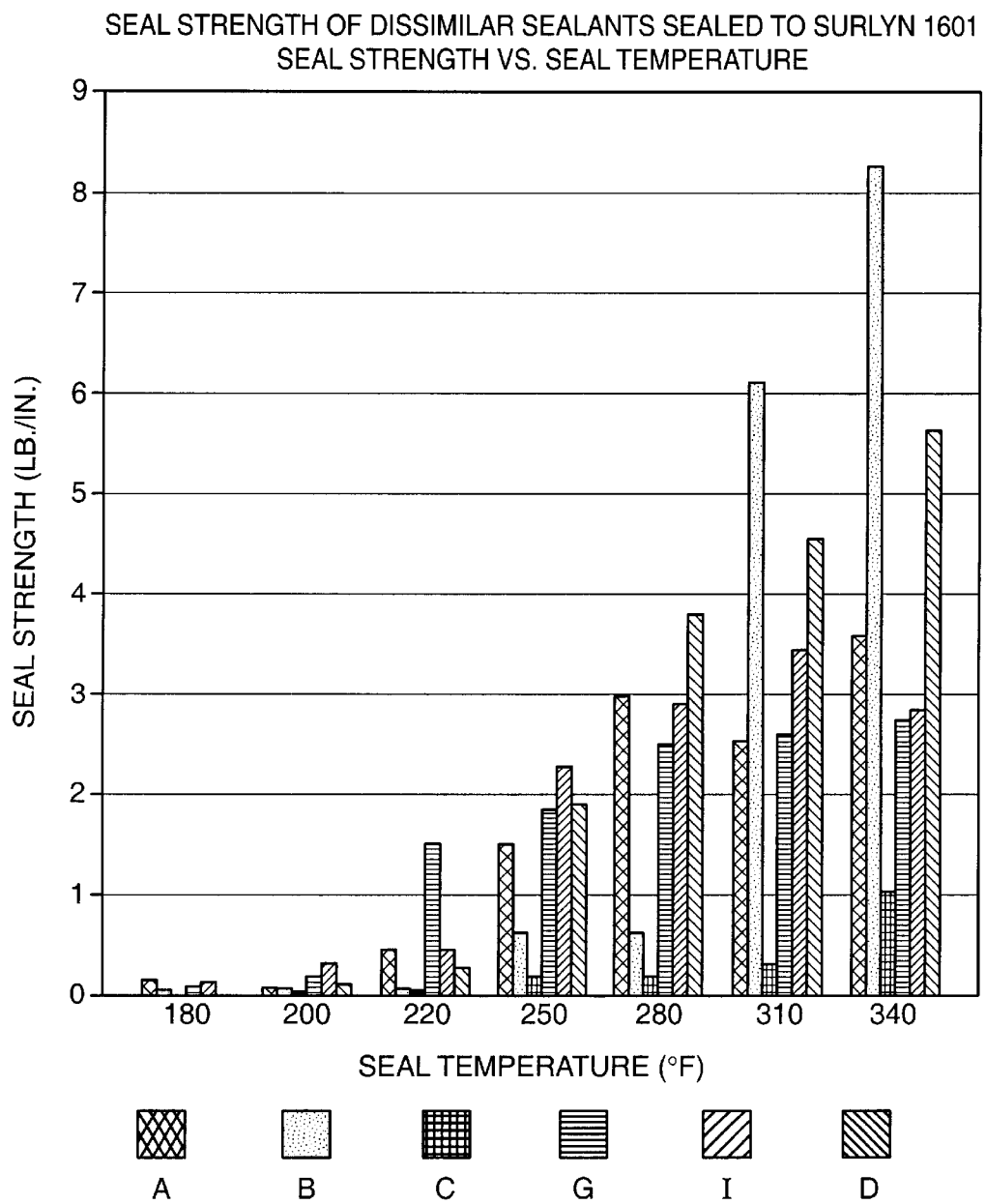
FIG. 24 is a bar graph representation of seal temperature (° F.) vs. seal strength (lb/in) results, and provides comparative data for the seal strength of various compositions in comparison with a specific ionomer resin.
Figure 25:
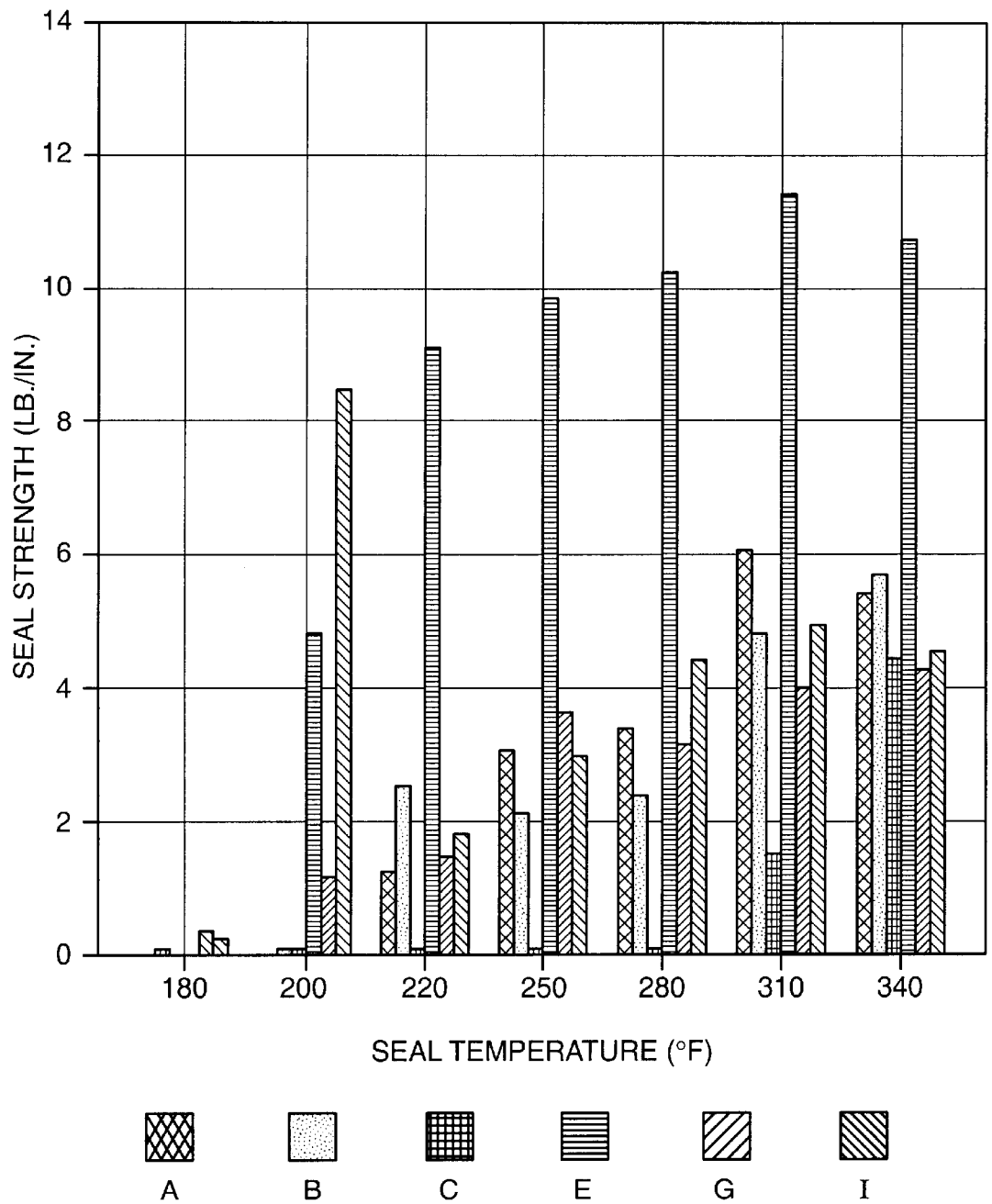
FIG. 25 is a bar graph representation of seal temperature (° F.) vs. seal strength (lb/in) results, and provides comparative data for the seal strength of various compositions being sealed to a specific ionomer resin.
Figure 26:
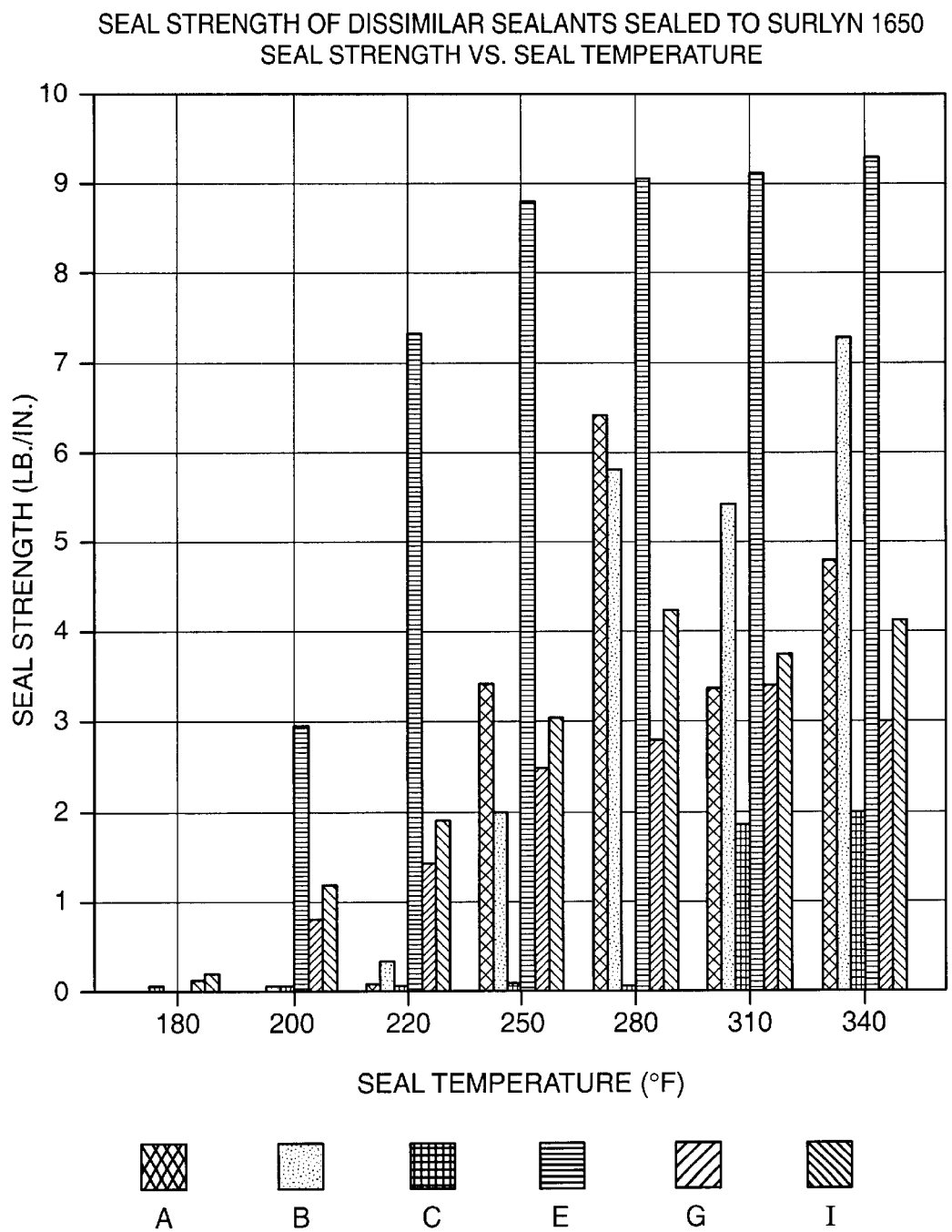
FIG. 26 is a bar graph representation of seal temperature (° F.) vs. seal strength (lb/in) results, and provides comparative data for the seal strength of various compositions being sealed to a specific ionomer resin.

FIG. 21 illustrates yet another process which can be used to make films in accord with the present invention. The process of FIG. 21 is as generally disclosed in U.S. Pat. No. 4,287,151, to ESAKOV, et. al., hereby incorporated by reference thereto, in its entirety.

In the process illustrated in FIG. 21, tubular extrudate 260 was downwardly formed from die 262, the tubular extrudate enclosing air mandrel 264. At approximately this point in the process, an exterior cooling means, in the form of water ring 266, encircles tubular extrudate 260. Water ring 266 in the shape of a circular tray, had an opening therethrough, the opening having a diameter slightly larger than that of tubular extrudate 260. A constant flow of water, at about 50° F., is supplied to water ring 266. The overflow from the water ring provided an annular film of water on the outer surface of extrudate 260. The water fell downwardly around the entire outer periphery of extrudate 260, thereby cooling extrudate 260. The film of water is collected by receptacle 268. Water was the preferred cooling medium because its heat capacity and heat transfer characteristics are such as to cool extrudate 260 more rapidly than a chilled gas would have. However, as an alternative to water ring 266, a fine spray of cooled water could have been directed against the exterior surface of the extrudate 260. In combination, air mandrel 264 and water ring 266 serve as the means to cool and solidify extrudate 260. In some instances, depending upon the polymer being extruded and upon the wall thickness of extrudate 260, either the interior or exterior cooling could be eliminated, because one cooling means alone would be sufficient to solidify the interior tube wall before reaching support plug 270. Once solidified, extrudate 272 is collapsed by rolls 274, to form a solidified lay flat tubing 276.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, supplemental elastomers, and the like additives known to those of skill in the art of packaging films.

Although the multilayer film of the present invention is preferably not irradiated, optionally the film may be irradiated. In the irradiation process, the film is subjected the film to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

Radiation dosages are referred to herein in terms of the radiation unit "RAD", with one million RADS, also known as a megarad, being designated as "MR". A suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface.

Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Although corona treatment is a preferred treatment of the multilayer film of the present invention, plasma treatment of the film may also be used.

Films such as those illustrated in FIGS. 4, 5, 6, 7, and 8, are especial suitable for use as forming web or lidstock in thermoforming type packaging operations. Regarding films designed for such use, preferably, the lidstock is a multilayer film comprising the same number of layers and relative layer percentages (thicknesses), differing only in that it has a total thickness of about 50% the total thickness of the forming web.

Both a forming web and a non-forming web can be fed from two separate rolls, with the forming web being fed from a roll mounted on the bed of the machine for forming the package "pocket," i.e., the product cavity. The non-forming (lidstock) web is usually fed from a top-mounted arbor for completing the airtight top seal of the package. Each web has its meat-contact/sealant surface oriented towards the other, so that at the time of sealing, the sealant surfaces face one another. The forming web is indexed forward by transport chains, and the previously sealed package pulls the upper non-forming web along with the bottom web as the machine indexes.

The first step in the packaging process is the formation of the product cavity in the forming web. The cavity forming is a three-step process: (1) index; (2) heat; (3) form. While one cavity is being formed, the web for the next cavity is undergoing preheating before being indexed over the pocket-forming die. To accomplish this, the forming web is heated from 70° C. to 80° C. by being pressed against a contact-type heater by means of vacuum. The forming web is then formed by use of compressed air or vacuum, or both. Compressed air pushes the heated film into the die cavity from above and, in turn, vacuum pressure pulls the film into shape from within the die. A plug is used to assist the movement of the heated film into the die cavity.

After forming, the transport chains carry the empty pocket to the loading station where the product is either hand loaded or pumped into the cavity. The transport chains then carry the loaded product to the vacuum and sealing station.

The sealing process is a series of operations occurring simultaneously or with a slight overlap. Once the top film is in place over the filled cavity, the sealing chamber closes. Package air is exhausted between the top and bottom films. The upper chamber, or lid, employs a heated seal plate set at from 150° C. to 170° C., which bonds the non-forming web and the forming web together.

The vacuum in the seal die balances chamber pressures, and ensures that no air is trapped between the product and the forming web. The sealing diaphragms, empty of air, are now filled with compressed air. This presses the heated sealing plate against the upper film, compressing the heat-sealable surfaces of the two webs between the sealing plate and the T-rubber sealing gasket. The heat and pressure of the sealing plate causes the two surfaces of the films to bond together, sealing the product in a vacuum environment. Approximately 0.4 to 0.5 seconds after sealing ends, the upper and lower chambers are vented to the atmosphere, causing the top and bottom films to collapse around the product. Now, the sealing diaphragms evacuate and the sealing plate moves back up. Outside air rushes into the chambers. When the air pressures are equalized, the die bottom can move down, allowing the package to be indexed out of the seal station.

The sealed package is then separated from the web by way of a contour knife system. The packages are conveyed through a hot water (205° F.) shrink tunnel. The packages are placed on racks and cooked in a high humidity oven. The product is then chilled and available for shipping or for further processing, which may involve stripping the package off of the product.

The invention is illustrated by the following examples, which are provided for the purpose of representation, and are not to be construed as limiting the scope of the invention. Unless stated otherwise, all percentages, parts, etc. are by weight, and all density figures are in g/cc.

EXAMPLE 1

A nine-layer multilayer film was produced in accordance with the process as illustrated in FIG. 21, described above.

Eight conventional single-screw extruders were employed to melt and pump various resins to a distribution block or adapter and then an annular coextrusion die. The EVOH layer was processed at temperatures of from about 350° F. and 450° F. The LLDPE, homogeneous ethylene/alpha-olein copolymer, elastomer and/or plastomer were extruded at a temperature of from about 400° F. to 500° F. The nylon-containing layers were processed at a temperature of from about 450° F. to 550° F. Tie layers, which were anhydride-grafted resins, were processed at temperatures of from about 420° F. to 460° F., regardless of the composition of the base resin, in order that the anhydride functionalities reacted to allow the tie layer to provide the desired compatibility. The melt distribution system and die were designed to produce uniform thickness distribution around the circumference of the die, for all nine layers.

The flattened tape 10" was passed through pinch rollers, heated in a hot water bath or by a hot air oven, and expanded by inflating the tube with high pressure air in what is well known in the art as the "trapped bubble technique." By this means, a thermoplastic film of desired thickness was produced. The oriented thermoplastic film, in the form of lay flat tubing 10''', which was then cut lengthwise, i.e., along both edge creases, to form two separate film sheets, each of which were thereafter wound up onto two substantially identical, but separate, rolls. Thereafter, each of the rolls of film was resized on a slitter, to produce a width and diameter suitable for a horizontal packaging machine, such as a TIROMAT(™) thermoforming packaging machine, MULTIVAC(™) thermoforming packaging machine, PIONEER(™) thermoforming packaging machine, or MAHAFFEY HARDER(™) thermoforming packaging machine. The film was used primarily as the forming film of the machine, but it could also be used as a non-forming film.

The film was suitable for the packaging of food products such as fresh and processed poultry, fresh and processed red meat, fresh and processed fish, and fresh and processed pork, cheese; more particularly, hot dogs, bacon, summer sausage, block cheese, and cheese sticks. The foods packaged in the film could be precooked, marinated, preseasoned, breaded, etc.

The film was suitable for use as a forming film and/or a non-forming film for cook-in applications, where the sealant layer is corona or irradiation treated so as to provide meat adhesion to the protein extracted meat emulsion mixture typical of cooled ham, turkey breast, and other further processed meat products.

In a corona treated state of from about 36 to 60 dyne/cm sec, the oxidized surface of the film increases the compatibility of the surface sealant layer, so as to provide even greater seal strength between the surface layer blend and sealants which are generally recognized as being incompatible with ionomer resins, such as SURLYN 1601(™) ionomer resin, SURLYN 1705(™) ionomer resin, and SURLYN 1650(™) ionomer resin. Because the outer heat-resistant forming layer is composed of polypropylene homopolymer, the treated outer sealant layer does not cause excessive blocking to occur.

Table V-B, above, provides the structural and compositional characteristics of the nine-layer film produced as described above. In Table V-B, the numerals indicating the "layer order" correspond with the position of the layers relative to one another, with layer 1 being the inside layer of the tube, and layer 6 being the outside layer of the tube. Layer 2 is in direct contact with layers 1 and 3, layer 3 in direct contact with layers 2 and 4, and so on. In contrast, the "layer name" designates the various layers as "first", "second", etc., these layer names corresponding with the detailed description of the respective Figures, as discussed above, and the names of the layers recited in the claims, as set forth below.

Three films were produced in accord with Example 1, the films differing only in total thickness (same relative proportion to each layer), the total thicknesses being about 2.5 mils, about 3 mils, and about 3.5 mils. The various resins in the layers were as follows: Layer #1 is a blend of (a) 65 weight percent EXACT 3027(™) homogeneous ethylene/alpha-olefin 0.900 g/cc resin, obtained from the Exxon Chemical Company, of Baytown, Tex., and (b) 35 weight percent TAFMER PO 480(™) 0.87 g/cc homogeneous ethylene/alpha-olefin copolymer plastomer resin, produced by Mitsui Sekka, of Japan, and obtainable from the Mitsui Petrochemicals (America), Ltd., of New York, N.Y. Layer #2 was a blend of (a) 55% ECD 301(™) 0.915 g/cc homogeneous ethylene/alpha-olefin copolymer resin, also obtained from the Exxon Chemical Company, (b) 35 weight percent TAFMER PO 480(™) homogeneous ethylene/alpha-olefin copolymer plastomer resin, and (c) 10 weight percent LD 200.48(™) LDPE resin, also obtained from the Exxon Chemical Company. Layer #3 and Layer #7 were each TYMOR 1203(™) LLDPE-based anhydride grafted copolymer, obtained from Morton International Inc., of Chicago, Ill. Layer #4 and Layer #6 were each a blend of (a) 85 weight percent ULTRAMID B35(™) polyamide resin, obtained from BASF Corporation of Charlotte, N.C., and (b) 15 weight percent GRIVORY G 21(™) amorphous polyamide resin, obtained from EMS-American Grilon, Inc. of Sumter, S.C. Layer #5 was SOARNOL E/T(™) polymerized ethylene vinyl alcohol copolymer resin (saponified ethylene vinyl acetate copolymer) produced by Nippon Gohsei, and obtained from Morton International Specialty Chemical Company, of Chicago, Ill. Layer #8 was ESCORENE PD 9012(™) (heterogeneous) propylene/ethylene copolymer resin, also obtained from the Exxon Chemical Company.

Layer #9 was ESCORENE PD 3445(™) (heterogeneous) polypropylene homopolymer, also obtained from Exxon Chemical Company.

EXAMPLE 2

A nine-layer film was produced in a manner substantially as described in Example 1, except that the ionomer was processed at a temperature of from about 400° F. to 500° F.

Table VI, above, provides the structural and compositional characteristics of the nine-layer film produced in this Example.

The film of Table VI, i.e., according to Example $^2$, had a total thickness of about 2 to 4 mils. The various resins in the layers were as follows: Layer #1 was SURLYN 1650(™) ethylene methacrylic acid copolymer resin, wherein the acid had been partially neutralized with a zinc base, such as zinc acetate. The SURLYN 1650(™) ethylene methacrylic acid copolymer resin was obtained from E.I. DuPont de Nemours, of Wilmington, Del. Layers #2, #3, #4, #5, #6, and #7 had the same chemical composition as the same-numbered layers of the nine-layer film of Example 1. However, Layer #8 was BYNEL CXA 3095(™) anhydride graft copolymer of an ethylene vinyl acetate copolymer resin, obtained from E.I. DuPont de Nemours. Layer #9 was ULTRAMID B35 polyamide resin, obtained from BASF Corporation of Charlotte, N.C.

After exiting the die, the. film was processed as described in Example 1, above. The film of this Example can be used to package products, especially the food products as described in Example 1.

The film of this Example used a relatively thin (0.2 mils) SURLYN(™) ionomer "cap layer", and hence is compatible with, i.e., readily sealable to, other films having an outer ionomer layer. However, before the instant invention it has been believed by those of skill in the art that sealant layers must comprise sufficient thickness so as to provide adequate material to flow around surface contamination such as oils, fats, and particulate matter, and surface imperfections in the exterior surface of the opposing sealing layer. If sufficient material is not present, seals through the contaminated area are frequently too weak to survive abuse and stresses during commercial distribution of the product packaged in the film.

The film of Example 2 utilized, in its "seal-assist layer", i.e., layer #2, almost the same blend used in the seal layer, i.e., layer #1, in the film of Example 1. In the film of Example 2, the seal-assist layer provided over 70 percent of the required thickness needed for sealability through contamination.

Furthermore, the film of Example 2, because of its outer nylon heat-resistant and abuse-resistant layer, i.e. Layer #9, could be used equally well as both a thermoforming and non-thermoforming film, on such high speed packaging machines used in the high speed packaging of, for example, hot dogs.

Finally, because the film of Example 2 utilizes a zinc SURLYN(™) ionomer resin sealant layer, it can be used for cook-in meat applications, with or without the addition of corona or irradiation treatment (i.e., oxidation) of the sealant layer.

EXAMPLE 3

The films produced in Examples 1 and 2 can be produced by the cast film process illustrated in FIG. 7. Six conventional single-screw extruders are employed to melt and pump the various resins through the injection block or manifold slot die system. The EVA-containing and EVOH-containing layers are extruded at a temperature of from about 350° F. to 450° F., and the LLDPE-containing layers are extruded at a temperature of from about 400° F. to 500° F. The nylon-containing layers are extruded at 450° F. to 550° F. The melt system and die are designed with flow channels to produce uniform distribution, across the width of the die, for all 7 layers.

Upon extrusion, the molten 7-layer web drops onto a water cooled chill roll having a temperature controlled to 40° F. to 60° F., which quickly brings the molten web to room temperature, or below room temperature, so that crystallization is minimized. This roll has internal spirally wound channels that direct the water flow beneath the outer shell to provide good heat transfer characteristics. The web is "pinned" to the chill roll with an air knife or electrostatic pinning device commonly used in cast film production.

The completed cast web is then wound into a roll and later resized to a width suitable for a horizontal packaging machine, such as a Multivac thermoforming packaging machine. The roll of film is used as the forming web in the thermoforming packaging machine.

EXAMPLE 4

A seven-layer film is produced by an upward blown coextrusion process, in which seven conventional, single-screw extruders are used to deliver melt and pump various polymer resins to a distribution manifold or adapter, which subsequently flows into distribution channels within an annular die.

FIG. 3 illustrates a schematic view of a process for making the seven-layer film in accordance with the present invention. Although for the sake of simplicity only one extruder 20 is illustrated in FIG. 3, there are preferably at least 2 extruders, and more preferably, at least three extruders. That is, preferably at least one extruder, and more preferably two extruders, supply molten polymer to coextrusion die 21 for the formation of, for example, outer layers 11 and 13 as illustrated in FIG. 1, and at least one additional extruder supplied molten polymer to coextrusion die 21 for the formation of, for example, core layer 12 as illustrated in FIG. 1. Each of the extruders is supplied with polymer pellets suitable for the formation of the respective layer it is extruding. The extruders subject the polymer pellets to sufficient pressure and heat to melt the polymer and thereby prepare it for extrusion through a die.

Taking extruder 20 as an example, each of the extruders is preferably equipped with a screen pack 22, a breaker plate 23, and a plurality of heaters 24. Each of the coextruded film layers is extruded between mandrel 25 and die 21, and the extrudate is cooled by cool air flowing from air ring 26. The resulting blown bubble is thereafter guided into a collapsed configuration by nip rolls 29, via guide rolls 28. The collapsed tube is optionally passed over treater bar 30, and is thereafter passed over idler rolls 31, and around dancer roll 32 which imparts tension control to collapsed tube 33, after which the collapsed tube is wound into roll 34 via winding mechanism 35.

Table VII, above, describes the seven-layer blown, coextruded film produced according to this Example. This seven-layer film is useful in substantially the same applications as described for the films of Examples 1 and 2. In the film of Table VII, produced according to this Example, the following is the identity of the various resins used in each of the seven layers. Layer #1 is a blend of: (a) 65 weight percent EXACT 3027(™) homogeneous ethylene/alpha-olefin 0.900 g/cc resin, obtained from the Exxon Chemical Company, of Baytown, Tex., and (b) 35 weight percent Vistalon(™) ethylene-propylene-diene terpolymer resin ("EPDM", also known as ethylene-propylene rubber), also obtainable from the Exxon Chemical Company. Layer #2 is BYNEL CXA 4125(™) anhydride-grafted LLDPE resin, obtainable from E.I. Dupont de Nemours, of Wilmington, Del. Layer #3 and Layer #5 are each a blend of (a) 80 weight percent CAPRON 1539(™) polyamide resin, obtainable from the Allied Signal Inc., of Morristown, N.J., and (b) 20 weight percent SELAR PA 3426(™) amorphous polyamide, also obtainable from E.I. DuPont de Nemours. Layer #4 is EVAL E101(™) ethylene vinyl alcohol copolymer resin, i.e., a 38 mole percent ethylene/vinyl alcohol copolymer, which is produced and distributed by the Eval Co. of America, of Lisle, Ill. Layer #6 is PLEXAR 107(™) anhydride modified EVA resin, obtainable from Quantum Chemical Company, of Pittsburgh, Pa. Layer #7 is CAPRON 8207(™) polyamide resin, also obtainable from the Allied Signal Inc.

EXAMPLE 5

An eight-layer film is produced by an upward-blown coextrusion process, in the manner as set forth in Example 4. Table VIII, above, provides the physical and chemical characteristics of this film. In the film produced according to this example, as set forth in Table VIII, above, the individual film layers were composed of the following specified polymers. Layer #1 is SURLYN 1601(™) ionomer resin, obtainable from E.I. DuPont de Nemours. Layer #2 is a blend of: (a) 55 weight percent ECD 301(™) 0.915 g/cc homogeneous ethylene/alpha-olefin resin, obtainable from the Exxon Chemical Company, (b) 35 weight percent EXACT SLP 9042(™) homogeneous ethylene/alpha-olefin copolymer resin, also obtainable from the Exxon Chemical Company, and (c) 10 weight percent PETROTHENE NA 345(™) 0.923 LDPE resin, obtained from the Quantum Chemical Company. Layer #3 is a blend of 80 weight percent ECD 301(™) 0.915 g/cc homogeneous ethylene/alpha-olefin resin, obtained from the Exxon Chemical Company, and 20 weight percent TYMOR 1N05(™) anhydride grafted LDPE resin, obtained from the Morton International, Inc., of Chicago, Ill. Layers #4 and #6 are ULTRAMID KR 4418 (™) polyamide resin, obtained from BASF, of Parsippany, N.J. Layers #5 and #7 are BYNEL CXA 3048(™) anhydride grafted EVA resin, obtained from E.I. DuPont de Nemours. Layer #8 is UBE 5033B(™) polyamide resin, obtained from UBE Industries (America) Inc., of New York, N.Y., and distributed by Nichimen America, Inc., of New York, N.Y.

EXAMPLE 6

Using an adhesive, a three-layer film is laminated to a PVDC coated, biaxially-oriented heat-set polyester film. The three-layer, upwardly-blown coextruded film is produced according to Example 4, using three single-screw extruders. Otherwise, the process was carried out in a manner analogous to the process described above in Example 4.

Table X provides the structure and chemcial characteristics of the three-layer film.

TABLE X

| layer order | layer name | layer function | chemical identity | percent of total film thickness |
|---|---|---|---|---|
| 1 | second | seal | ionomer | 10 |
| 2 | first | seal-assist | 70% 0.900 g/cc homogeneous Et/alpha-olefin; 30% 0.88 g/cc homogeneous plastomer | 30 |
| 3 | third | bulk | 80% 0.920 LLDPE; 20% 0.923 LDPE | 60 |

Layer #1 is SURLYN 1705(™) ionomer resin, obtainable from E.I. DuPont de Nemours. Layer #2 is a blend of (a) 70 weight percent AFFINITY PM 1870(™) homogeneous ethylene/alpha-olefin copolymer resin, obtainable from the Dow Chemical Company, and (b) 30 weight percent TAFMER PO 480(™) 0.87 g/cc homogeneous ethylene/alpha-olefin copolymer plastomer resin, produced by Mitsui Sekka, of Japan, and obtainable from the Mitsui Petrochemicals (America), Ltd., of New York, N.Y. Layer #3 is a blend of (a) 80 weight percent DOWLEX 2045(™) homogeneous ethylene/alpha-olefin copolymer resin, obtainable from the Dow Chemical Company, and (b) 20 weight percent ESCORENE LD 200.48(™) 0.923 g/cc polyethylene homopolymer resin, obtainable from the Exxon Chemical Company.

The blown, coextruded film had a total thickness of about 2 mils. The blown, coextruded film was then adhesively laminated to a second film, resulting in a laminate. The second film was composed of MYLAR M44(™) PVDC-coated, biaxially-oriented, polyethylene terephthalate film, obtainable from E.I. DuPont de Nemours. The urethane adhesive used is ADCOTE 545-E(™) polyurethane adhesive, obtainable from Morton International, Inc., of Chicago, Ill. The resulting laminate has the cross-sectional structure:

oriented polyethylene terephthalate, 0.48 mils
PVDC coating, 0.08 mils
Urethane Adhesive, 0.12 mils
Blend of LLDPE and LDPE, 1.2 mils
blend of homogeneous ethylene/alpha-olefin copolymer plastomer: 0.60 mils
ionomer, 0.20 mils The film of Example 6 is suitable for both thermoforming applications as well as non-thermoforming applications; for horizontal packaging machines where the forming film utilizes a sealing layer of an ionomer or a blend of homogeneous ethylene/alpha-olefin copolymer with elastomer. The film of Example 6 can be used to package products in a manner as described for the films of Examples 1 and 2.

Forming films can be produced by the method of Example 6, i.e., adhesive laminating by replacing the oriented, heat-set polyester film with a non-oriented, cast nylon film (typically at 2 mils and 4 mils thick) which can optionally be PVDC coated, in order to provide an $O_2$ barrier. Typical of the coated laminating films which may be so used are: (a) DARTEK B 601(™) PVDC coated cast polyamide film, distributed by E.I. DuPont de Nemours, of Wilmington, Del., and (b) CAPRAN 77 DFK(™) PVDC-coated, cast polyamide film, obtainable from the Allied Signal Inc.

EXAMPLE 7

Using an adhesive, a three-layer film is laminated to a PVDC coated, biaxially-oriented heat set polyester film. The three-layer, upwardly-blown coextruded film is produced according to Example 4, except that the process uses three single-screw extruders.

Table III, above, together with the accompanying description of FIG. 3, provides the structure and chemcial composition of the three-layer film of Example 7. In the film as illustrated in Table III but being produced specifically in accord with this Example, Layer #1 is SURLYN 1705(™) ionomer resin, obtainable from E.I. DuPont de Nemours. Layer #2 is a blend of (a) 70 weight percent AFFINITY PM 1870(™) homogeneous ethylene/alpha-olefin copolymer resin, obtainable from the Dow Chemical Company, and (b) 30 weight percent TAFMER PO 480(™) 0.87 g/cc homogeneous ethylene/alpha-olefin copolymer plastomer resin, produced by Mitsui Sekka, of Japan, and obtainable from the Mitsui Petrochemicals (America), Ltd., of New York, N.Y. Layer #3 is a blend of (a) 80 weight percent DOWLEX 2045(™) homogeneous ethylene/alpha-olefin copolymer resin, obtainable from the Dow Chemical Company, and (b) 20 weight percent ESCORENE LD 200.48(™) 0.923 g/cc polyethylene homopolymer resin, obtainable from the Exxon Chemical Company.

The blown, coextruded film illustrated in FIG. 3 had a total thickness of about 3 mils. The blown, coextruded film was then adhesively laminated to a second film, resulting in a laminate. The second film was composed of MYLAR M44(™) PVDC-coated, biaxially-oriented, polyethylene terephthalate film, obtainable from E.I. DuPont de Nemours. The urethane adhesive used is ADCOTE 545-E(™) polyurethane adhesive. The resulting laminate has the cross-sectional structure:

---
oriented polyethylene terephthalate, 0.48 mils
PVDC coating, 0.08 mils
Urethane Adhesive, 0.12 mils
Blend of LLDPE and LDPE, 2.19 mils
blend of homogeneous ethylene/alpha-olefin copolymer, 0.60 mils
ionomer, 0.21 mils
---

The film of Example 7 is suitable for both thermoforming applications as well as non-thermoforming applications; for horizontal packaging machines where the forming film utilizes a sealing layer of an ionomer or a blend of homogeneous ethylene/alpha-olefin copolymer with elastomer. The film of Example 7 can be used to package products in a manner as described for the films of Examples 1 and 2.

Although the film of Example 7 is very similar to the film of Example 8, the film of Example 8 has the advantage of further reducing the thickness of the ionomer outer sealant layer relative to the total film thickness when compared to the film of Example 6.

EXAMPLE 8

A casing, used to package processed meat products, such as cooked ham, turkey rolls, sausage, bologna, etc., is produced using a 3 mil (total thickness) upwardly-blown, coextruded multilayer film, the multilayer film being produced in a manner as set forth in Example 4, except that a total of from 4 to 6 single-screw extruders can be used in the process.

Table IX, above, provides the physical and chemical characteristics of this multilayer film. More particularly, in the multilayer film produced according to this Example as generally illustrated and described in FIG. 9 and Table IX, each of the layers is composed of the following specific polymers. Layer #1 is SURLYN 1650(™) ionomer resin, obtainable from E.I. DuPont de Nemours. Each of Layers #2 and #6 are a blend of: (a) 65 weight percent ECD 301(™) 0.915 g/cc ethylene/alpha-olefin copolymer resin, obtainable from the Exxon Chemical Company; and, (b) 35 weight percent TAFMER PO 480(™) 0.87 g/cc homogeneous ethylene/alpha-olefin copolymer plastomer resin, produced by Mitsui Sekka, of Japan, and obtainable from the Mitsui Petrochemicals (America), Ltd., of New York, N.Y. Layers #3 and #5 are TYMOR 1203(™) anhydride modified grafted linear low density polyethylene resin, obtainable from Morton International Specialty Chemical Company, of Chicago, Ill. Layer #4 is ULTRAMID B36(™) polyamide resin, obtainable from BASF Corporation.

Although the six-layer film which can be produced according to Example 8 is suitable to a variety of end uses, the six-layer film of Example 8 is especially suited to use in the packaging of processed meat, especially meat emulsions and sausage, which is frequently packaged in a shirred casing, as is known to those of skill in the art. For example, U.S. Pat. No. 4,044,426, to Kupcikevicius, et. al., which is hereby incorporated by reference thereto, in its entirety, describes apparatus and method for stuffing viscous food products into a shirred tubular casing article. Numerous other documents describe shirred casings, processes for their use, and packaged products using same, including: U.S. Pat. No. 3,553,768, to WILMSEN; U.S. Pat. No. 3,798,302, to KOSTNER, et. al.; and U.S. Pat. No. 4,558,488, to MARTINEK, each of which is hereby incorporated by reference thereto, in its entirety.

A casing is produced from the above-described six-layer film according to Example 8, by processing resized sheeting to allow for the required casing circumference and lap seal (side of the film) overlap. By heat-sealing the film to itself, a tube is produced, which can be shirred and later stuffed with a processed meat emulsion. The interior surface of the tube is the ionomer-containing layer, i.e., Layer #1, as designated in the table immediately above.

Ionomer is known to provide meat-adhesion for cook-in products such as ham emulsion, turkey emulsion, and chicken emulsion, which are used in the production of, for example, the respective products of cooked ham and pressed ham, turkey roll and chicken roll, and luncheon meats.

A shirred casing strand is inserted onto a stuffing horn, with the sealed or clipped end at the exit orifice of the stuffing horn. The casing is fed through a brake hole through which the meat mixture is then pumped. This mechanism allows the meat mixture to be pumped into the casing at a controlled pressure (i.e., the hydrostatic pressure developed by the elastic memory of the stretched casing).

Additionally, a homogeneous ethylene/alpha-olefin copolymer, such as EXACT 3027(™) homogeneous ethylene/alpha-olefin copolymer, obtainable from the Exxon Chemical Company, can be used alone in Layer #6, and still provide sufficient seal strength to survive shirring, stuffing with meat product, and cook-in. The reduced seal strength relative to the use of ionomer as the outer sealing layer (i.e., a seal strength reduction of from about 8 to 10 lb/in, to about 4 to 6 lbs/in) may allow the product handlers the advantage of removing the casing by peeling the casing open at the lap seal, rather than cutting the casing open with knives and/or scissors.

FIGS. 22–29, together with TABLE XI, provide comparative results illustrating the performance characteristics of seals produced according to the present invention in comparison with seals using films not in accordance with the present invention. The comparative results indicate that seals made according to the present invention can be as substantially as strong as ionomer to ionomer seals of films not in accordance with the present invention.

However, some of the comparative results indicate a less than optimal sealing performance of seals produced according to the present invention. It is believed that this less than optimal performance could be improved upon by merely increasing the level of the second component in the composition.

Figure 27:
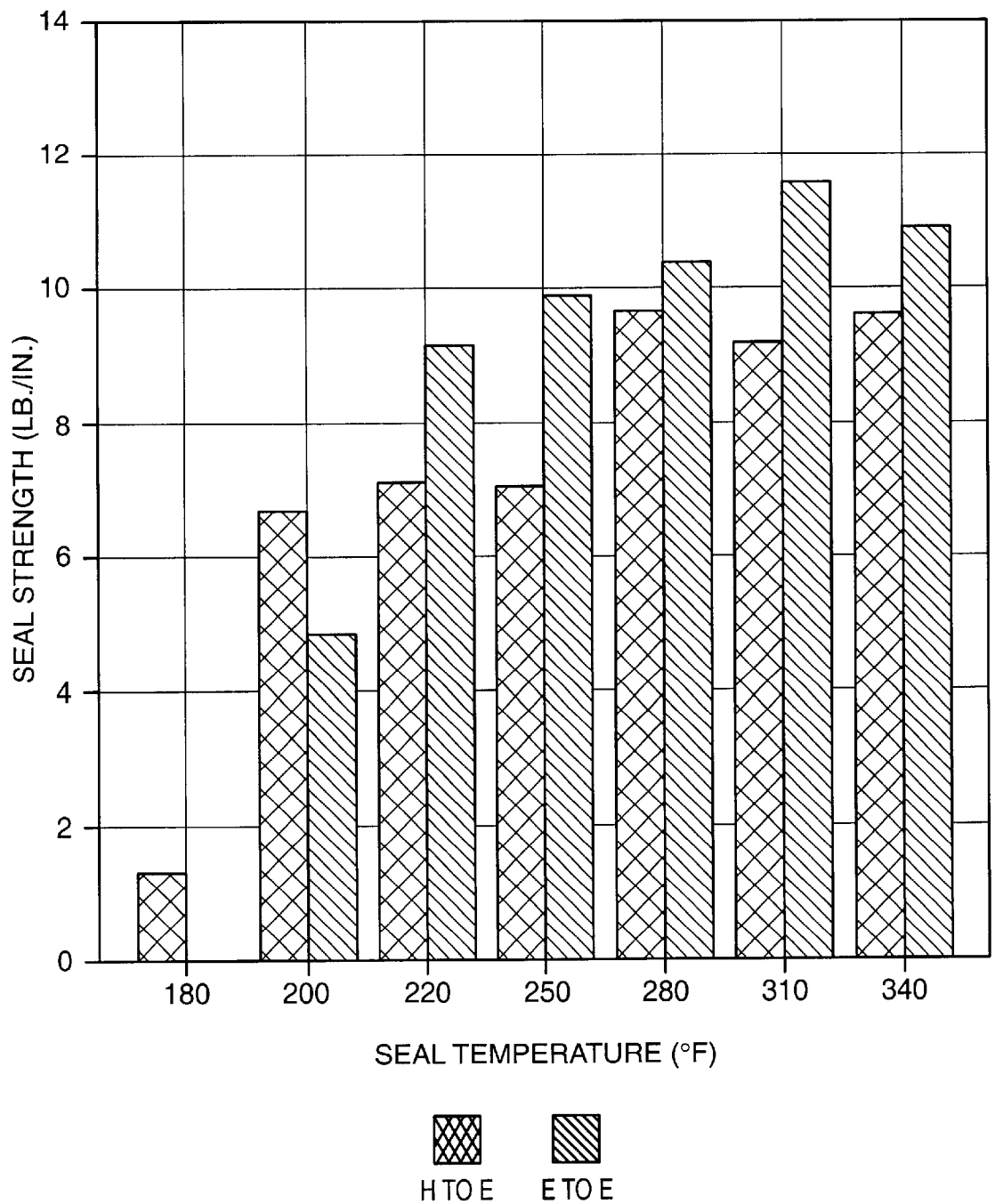
FIG. 27 is a bar graph representation of seal temperature (° F.) vs. seal strength (lb/in) results, and provides comparative data for the seal strength of an "ionomer capped" multilayer film to a specific ionomer, versus a conventional ionomer to ionomer seal.
Figure 28:
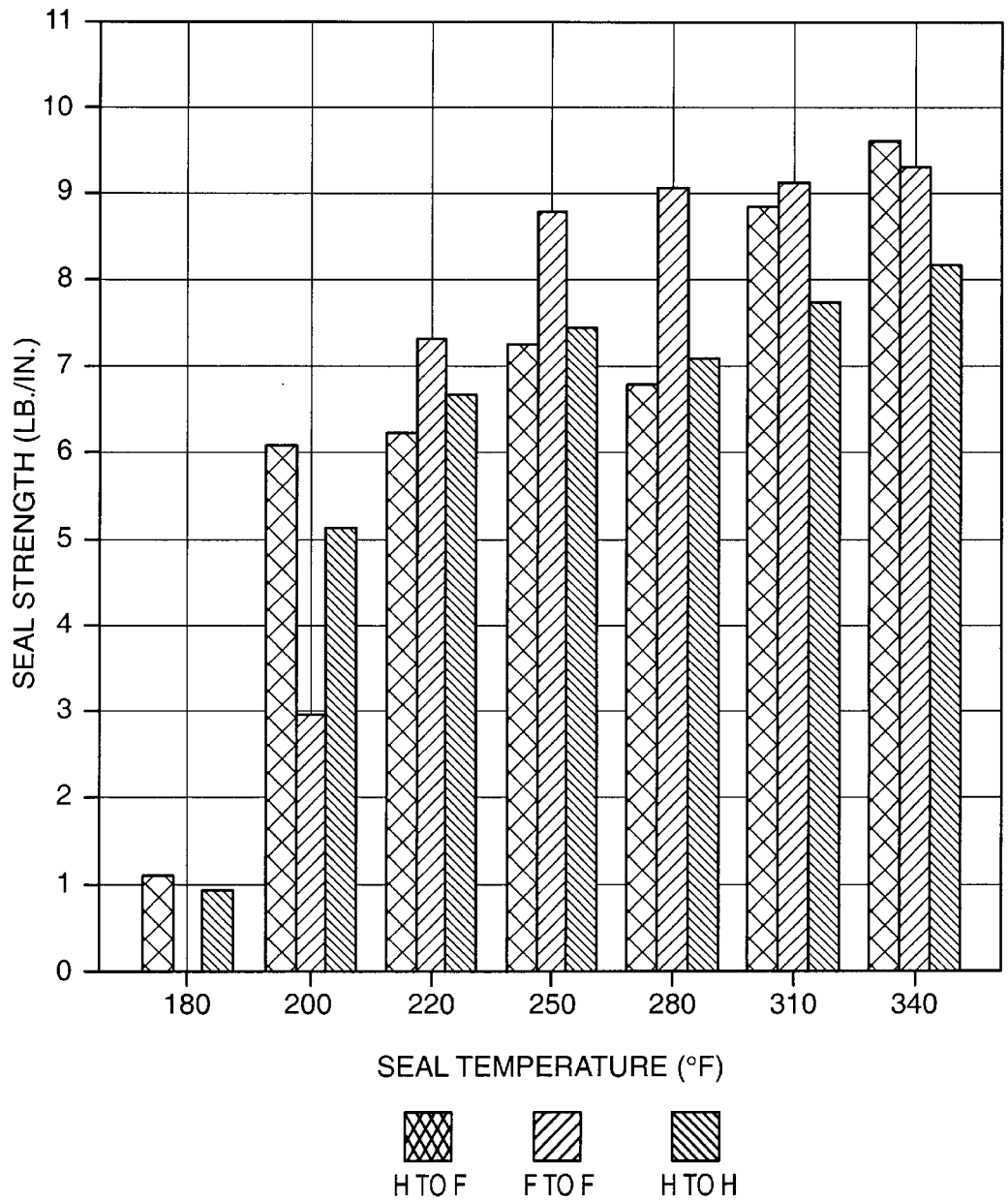
FIG. 28 is a bar graph representation of seal temperature (° F.) vs. seal strength (lb/in) results, and provides comparative data for the seal strength for two multilayer film structures versus a conventional ionomer to ionomer seal.
Figure 29:
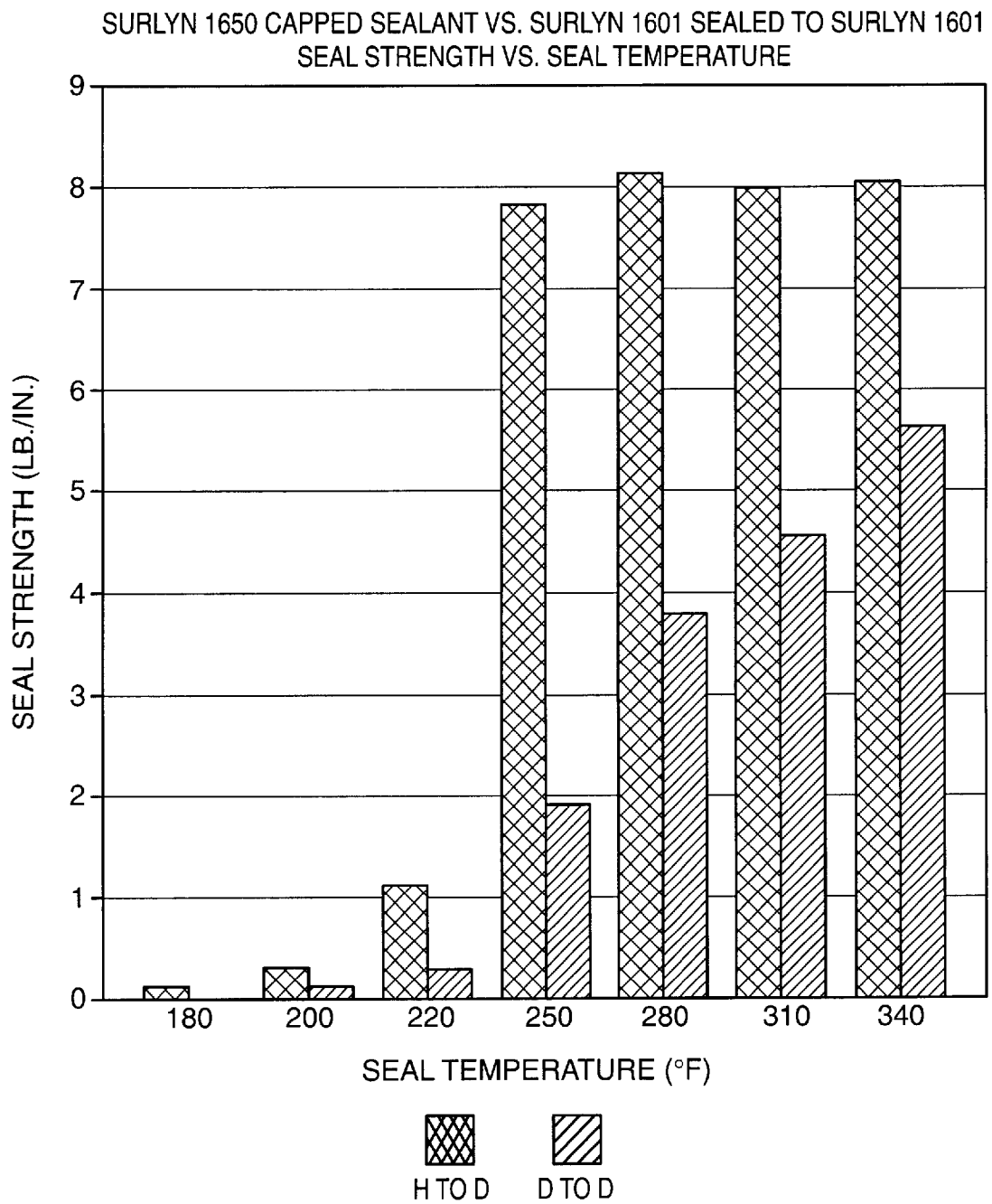
FIG. 29 is a bar graph representation of seal temperature (° F.) vs. seal strength (lb/in) results, and provides comparative data for the seal strength for a specific "ionomer capped" multilayer film to a specific ionomer, versus a conventional ionomer to ionomer seal.

Excellent sealing results are apparent, for example, in FIGS. 27, 28, and 29, in which a multilayer film having a thin, 100% ionomer outer sealant layer backed up by a relatively thick layer comprising the composition comprising the first and second components, was sealed to a film having a 100% ionomer outer sealant layer.

TABLE XI

IDENTITY OF RESIN USED IN FILMS OF FIGS. 22 THROUGH 29

| 1ST RESIN | WGT % | 2ND RESIN | WGT % | 3RD RESIN | WGT % | SEAL KEY |
|---|---|---|---|---|---|---|
| EXXACT 3027 | 100 | | | | | A |
| EXXACT 3027 | 100 | | | | | A |
| EXXACT 3027 | 100 | | | | | A |
| EXXACT 3027 | 100 | | | | | A |
| EXXACT 3027 | 100 | | | | | A |
| ESCORENE ECD301 | 55 | TAFMER P0480 | 35 | ESCORENE LD200.48 | 10 | B |
| ESCORENE ECD301 | 55 | TAFMER P0480 | 35 | ESCORENE LD200.48 | 10 | B |
| ESCORENE ECD301 | 55 | TAFMER P0480 | 35 | ESCORENE LD200.48 | 10 | B |
| ESCORENE ECD301 | 55 | TAFMER P0480 | 35 | ESCORENE LD200.48 | 10 | B |
| ESCORENE ECD301 | 55 | TAFMER P0480 | 35 | ESCORENE LD200.48 | 10 | B |
| DOWLEX 2244A | 100 | | | | | C |
| DOWLEX 2244A | 100 | | | | | C |
| DOWLEX 2244A | 100 | | | | | C |
| SURLYN 1601 | 100 | (LAMINATION) | | | | D |
| SURLYN 1705 | 100 | | | | | E |
| SURLYN 1650 | 100 | | | | | F |
| EXACT SLP9042 | 75 | TAFMER P0480 | 25 | | | G |
| EXACT SLP9042 | 75 | TAFMER P0480 | 25 | | | G |
| EXACT SLP9042 | 75 | TAFMER P0480 | 25 | | | G |
| EXACT SLP9042 | 75 | TAFMER P0480 | 25 | | | G |
| CAP OF SURLYN 1650 | 100 | | | | | H |
| CAP OF SURLYN 1650 | 100 | | | | | H |
| CAP OF SURLYN 1650 | 100 | | | | | H |
| CAP OF SURLYN 1650 | 100 | | | | | H |
| EXXACT 3027 | 75 | TAFMER P0480 | 25 | | | I |
| EXXACT 3027 | 75 | TAFMER P0480 | 25 | | | I |
| EXXACT 3027 | 75 | TAFMER P0480 | 25 | | | I |
| EXXACT 3027 | 75 | TAFMER P0480 | 25 | | | I |

Although the present invention has been described with reference to particular means, materials, and embodiments, it should be noted that the invention is not to be limited to the particulars disclosed, and extends to all equivalents within the scope of the claims.

What is claimed is:

1. A multilayer film comprising:
   an outer sealant layer comprising at least one member selected from the group consisting of ionomer, carboxyl-modified polyethylene, and ethylene/acid copolymer, the outer layer having a thickness of from about 1 percent to 20 percent, based on a total thickness of the multilayer film;
   a core seal-assist layer comprising a composition comprising:
   (A) a first component comprising at least one member selected from the group consisting of polyethylene homopolymer, ethylene/alpha-ofefin copolymer, ethylene/vinyl acetate copolymer, and ethylene/acrylate copolymer; and
   (B) a second component comprising at least one member selected from the group consisting of elastomer, homogeneous ethylene/alpha-olefin copolymer having a density of from about 0.86 to 0.91 g/cc, ionomer, and carboxyl-modified polyethylene;
   wherein the first component is chemically different from the second component, and wherein the outer sealant layer has a thickness of from about 1 to 20 percent, based on the total thickness of the multilayer film, and the core seal-assist layer has a thickness of from about 10 to 95 percent, based on the total thickness of the multilayer film.

2. The multilayer film according to claim 1, wherein the first component comprises a first ethylene/alpha-olefin copolymer having a first Vicat softening point, and the second component comprises a homogeneous ethylene/alpha-olefin copolymer having a second Vicat softening point, wherein a difference between the first Vicat softening point and the second Vicat softening point is from about 1° C. to 100° C.

3. The multilayer film according to claim 2, wherein the difference between the first Vicat softening point and the second Vicat softening point is from about 20° C. to 50° C.

4. The multilayer film according to claim 1, wherein:
   the first component comprises ethylene/alpha-olefin copolymer having a density of from about 0.88 g/cc to 0.93 g/cc; and
   the second component comprises at least one member selected from the group consisting of elastomer, homogeneous ethylene/alpha-olefin copolymer having a density of from about 0.86 to 0.879, ionomer, and carboxyl-modified polyethylene.

5. The multilayer film according to claim 4, wherein:
   the first component comprises a homogeneous ethylene/alpha-olefin copolymer having a density of from about 0.88 to 0.92;

the homogeneous ethylene/alpha-olefin copolymer of the second component has a density of from about 0.86 to 0.879.

6. The multilayer film according to claim 1, wherein the outer sealant layer has a thickness of from about 5 to 15 percent, based on the total thickness of the multilayer film, and the core seal-assist layer has a thickness of from about 10 to 95 percent, based on the total thickness of the multilayer film.

7. The multilayer film according to claim 6, wherein the outer sealant layer has a thickness of about 7 to 10 percent, based on the total thickness of the multilayer film, and the core seal-assist layer has a thickness of about 10 to 50 percent, based on the total thickness of the multilayer film.

8. The multilayer film according to claim 7, wherein the outer sealant layer has a thickness of from about 6 to 8 percent, based on the total thickness of the multilayer film, and the core seal-assist layer has a thickness of from about 20 to 30 percent, based on the total thickness of the multilayer film.

9. The multilayer film according to claim 1, wherein the outer sealant layer has a seal initiation temperature of from about 175° F. to 300° F.

10. The multilayer film according to claim 9, wherein the oute sealant layer comprises ionomer.

11. The multilayer film according to claim 1, wherein the composition in the seal-assist layer comprises from about 50 to 75 weight percent of the first component with from about 50 to 25 weight percent of the second component, based on the weight of the composition.

12. The multilayer film according to claim 1, wherein the core seal-assist layer has a seal initiation temperature of from about 175° F. to 300° F.

13. The multilayer film according to claim 1, wherein the first component compnses at least one member selected from the group consisting of polyethylene homopolymer, ethylene/alpha-olefin copolymer having a density of from about 0.88 to 0.92 g/cc, ethylene/vinyl acetate copolymer, and ethylene/acrylate copolymer.

14. The multilayer film according to claim 13, wherein the second component comprises at least one member selected from the group consisting of elastomer, homogeneous ethylene/alpha-olefin copolymer having a density of from about 0.86 to 0.879 g/cc, ionomer, and carboxyl-modified polyethylene.

15. The multilayer film according to claim 13, wherein the first component comprises at least one member selected from the group consisting of polyethylene homopolymer, ethylene/alpha-olefin copolymer having a density of from about 0.89 to 0.92 g/cc, ethylene/vinyl acetate copolymer, and ethylene/acrylate copolymer.

16. The multilayer film according to claim 5, the second component comprises at least one member selected from the group consisting of elastomer, homogeneous ethylene/alpha-olefin copolymer having a density of from about 0.86 to 0.879 g/cc, ionomer, and carboxyl-modified polyethylene.

17. The multilayer film according to claim 15, wherein the first component comprises at least one member selected from the group consisting of polyethylene homopolymer, ethylene/alpha-olefin copolymer having a density of from about 0.90 to 0.92 g/cc, ethylene/vinyl acetate copolymer, and ethylene/acrylate copolymer.

18. The multilayer film according to claim 17, wherein the second component comprises at least one member selected from the group consisting of elastomer, homogeneous ethylene/alpha-olefin copolymer having a density of from about 0.86 to 0.879 g/cc, ionomer, and carboxyl-modified polyethylene.

19. The multilayer film according to claim 17, wherein the first component comprises at least one member selected from the group consisting of polyethylene homopolymer, ethylene/alpha-olefin copolymer having a density of from about 0.90 to 0.915 g/cc, ethylene/vinyl aceate copolymer, and ethylene/acrylate copolymer.

20. The multilayer film according to claim 19, wherein the second component comprises at least one member selected from the group consisting of elastomer, homogeneous ethylene/alpha-olefin copolymer having a density of from about 0.86 to 0.879 g/cc, ionomer, and carboxyl-modified polyethylene.

21. The multilayer film according to claim 1, wherein the outer layer has a thickness of from about 1 percent to 15 percent, based on a total thickness of the multilayer film.

22. The multilayer film according to claim 1, wherein the outer layer has a thickness of from about 5 percent to 15 percent, based on a total thickness of the multilayer film.

23. The multilayer film according to claim 1, wherein the outer layer has a thickness of from about 7 percent to 10 percent, based on a total thickness of the multilayer film.

24. The multilayer film according to claim 1, wherein the outer layer has a thickness of from about 6 percent to 8 percent, based on a total thickness of the multilayer film.

* * * * *